(12) United States Patent
Kasper

(10) Patent No.: US 11,839,335 B2
(45) Date of Patent: Dec. 12, 2023

(54) DISPENSER, DISPENSING SYSTEM, AND DISPENSING METHOD

(71) Applicant: STELLENBOSCH UNIVERSITY, Stellenbosch (ZA)

(72) Inventor: Kimberly Ann Kasper, Stellenbosch (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 0 days.

(21) Appl. No.: 17/549,304

(22) Filed: Dec. 13, 2021

(65) Prior Publication Data

US 2022/0183508 A1 Jun. 16, 2022

(30) Foreign Application Priority Data

Dec. 14, 2020 (ZA) .................................. 2020/07775

(51) Int. Cl.
  *A47J 47/01* (2006.01)
  *B65D 83/06* (2006.01)
(52) U.S. Cl.
  CPC .............. *A47J 47/01* (2013.01); *B65D 83/06* (2013.01)
(58) Field of Classification Search
  CPC ................................ A47J 47/01; B65D 83/06
  See application file for complete search history.

(56) References Cited

U.S. PATENT DOCUMENTS

| | | | | | |
|---|---|---|---|---|---|
| 3,945,534 | A | * | 3/1976 | Ady | A47J 47/01 222/105 |
| 5,975,366 | A | * | 11/1999 | Ridgley | A47J 47/01 222/196 |
| 2007/0187433 | A1 | * | 8/2007 | Webster | B65D 47/04 222/333 |
| 2013/0199663 | A1 | * | 8/2013 | Newbold | G01G 19/32 222/77 |
| 2015/0060481 | A1 | | 3/2015 | Murray et al. | |
| 2020/0115092 | A1 | * | 4/2020 | Nehus | B65D 35/285 |

FOREIGN PATENT DOCUMENTS

| | | |
|---|---|---|
| AU | 542706 B | 3/1985 |
| EP | 0714016 A2 | 5/1996 |
| EP | 2199208 A1 | 8/2012 |
| GB | 2554887 A | 4/2018 |
| JP | H10167351 A | 4/2007 |

OTHER PUBLICATIONS

KitchenArt 57010 Amazon Page. Accessed Dec. 21, 2021. https://www.amazon.com/KitchenArt-Select-Auto-Measure-Carousel-Professional/dp/B0000VLQTS/ref=sr_1_1?dchild=1&keywords=spice%2Bdispenser&qid=1605531103&sr=8-1&th=1.

* cited by examiner

*Primary Examiner* — Jeremy Carroll
(74) *Attorney, Agent, or Firm* — BALLARD SPAHR LLP

(57) ABSTRACT

A dispenser, a dispensing system and a dispensing method are disclosed. A plurality of dispensers may be implemented. The dispenser includes a flexible container having a top and a bottom and capable of holding a product therein, the flexible container including top and bottom openings. A rigid support structure that supports the flexible container is provided. A moveable dispensing arm that operatively facilitates product dispensing is also provided. The moveable dispensing arm is operable between a dispensing condition and a retaining condition, and it includes a pinching edge which is configured to pinch the flexible container shut in either the dispensing condition or the retaining condition of the dispensing arm.

19 Claims, 23 Drawing Sheets

```
/* Designer Definitions – Public */
#define LED_CTRL_ADDR 0x2B
#define LED_CTRL_REG_TYPE uint8_t
#define LED_CTRL_LSB 3
```

```
/* Private Definitions */
#define COMMAND 0
#define COMMAND_CHECK 0x04
#define ADDRESS 1
#define ADDR_CHECK 0x05
#define LED_CTRL *((LED_CTRL_REG_TYPE*)LED_CTRL_ADDR)
#define SPICE_MASK 0x0F
#define LIGHT 0x4C
```

```
/* Analyse character received or copied into "command" buffer containing, for
example 0x4C, 0x5_ */
...
{ if ((command[COMMAND] >> 4) == COMMAND_CHECK)
 { switch(command[COMMAND])
    { case LIGHT:
            if ((command[ADDRESS] >> 4) == ADDR_CHECK)
                    { light(command[ADDRESS]); }
    break;
...
```

```
/* Light the correct container */
void light(uint8_t address){
   LED_CTRL &= ~(SPICE_MASK << LED_CTRL_LSB);
   LED_CTRL |= (address << LED_CTRL_LSB);}
```

FIGURE 27

DISPENSER, DISPENSING SYSTEM, AND DISPENSING METHOD

CROSS-REFERENCE TO RELATED APPLICATION

This application claims priority from South African complete patent application number 2020/07775 filed on 14 Dec. 2020, which is incorporated by reference herein.

FIELD OF THE INVENTION

This invention relates to product dispensing. More particularly, but not exclusively, the invention relates to a dispenser, a dispensing system and a dispensing method for dispensing products such as foodstuffs.

BACKGROUND TO THE INVENTION

Within food preparation, measuring and dispensing dry ingredients may provide an area with untapped potential for optimisation. Cooking with spices has usually required an elongated process comprised of opening jars, finding the right measuring spoons and measuring the correct amount before closing and putting away the jars. The many steps required greatly reduces the efficiency of home cooking. For some people, like those with limited mobility (who may already be at risk for several health concerns), it may present unnecessary challenges. For example, grip strength (a requisite for performing these tasks) can decline with age, health conditions and many other factors, suggesting those most in need of the benefits of home cooking can find the task the most difficult.

US 2015/0060481 A1 to Murray et al discloses an automated dispenser for dispensing spices, condiments, herbs, teas, ground coffees, or powdered beverages, comprising a plurality of cartridges mounted on a carrier respectively containing said items, having a dispending means with relative movement capable between said dispensing means and said cartridges. A look-up table, containing a plurality of separate, discrete dispensing programs is provided for operation of the dispensing means to dispense a particular variety of mixtures and quantities from said cartridges. When a spice blend and associated dispensing program is selected by a user, the dispensing program aligns the dispensing means relative to the cartridge carrier and cartridge, to dispense a particular quantity and, in the case of a mix, to subsequently align with other selected cartridges to provide, from said cartridges, the mix of spices, herbs, condiments, powdered beverages or ground coffees. A specialized cartridge adapted for use in said automated dispenser is also disclosed. This device is complex and includes rotational parts that require precise alignment and may therefore require sophisticated control. This may make maintenance cumbersome, and excessive wear of components may be prevalent, because the interaction of particles with mechanics may produce significant wear to mechanical parts. This device may also be difficult to clean.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the disclosure there is provided a dispenser comprising:

- a flexible container having a top and a bottom and capable of holding a product therein, the flexible container including top and bottom openings;
- a rigid support structure that supports the flexible container; and
- a moveable dispensing arm that operatively facilitates product dispensing, wherein the moveable dispensing arm is operable between a dispensing condition and a retaining condition, the dispensing arm including a pinching edge which is configured to pinch the flexible container shut in either the dispensing condition or the retaining condition of the dispensing arm.

The moveable dispensing arm may, in use, be moved by an actuator operable to move the dispensing arm between the dispensing condition and the retaining condition.

The flexible container may be arranged such that movement of the dispensing arm from the retaining condition to the dispensing condition causes the flexible container to elastically deform, thereby facilitating product to be dislodged or released from an inner wall of the flexible container.

The moveable dispensing arm may be arranged to retain product in the flexible container in the retaining condition.

The pinching edge may be configured to pinch the flexible container shut in the dispensing condition at a location above its bottom opening, so that any product located operatively below the pinching edge may be dispensed.

The pinching edge may be configured to pinch the flexible container at or near its bottom opening in the retaining condition of the dispensing arm, so as to inhibit more product from being dispensed.

The dispensing arm may include a retaining surface arranged to close the bottom opening of the flexible container in the retaining condition of the dispensing arm.

The rigid support structure may have a hole therethrough, wherethrough the flexible container may extend in use. The rigid support structure may have a plurality of holes therethrough, wherethrough the flexible container may extend in use.

In use, the dispensing arm and actuator may be arranged to pinch or clamp the flexible container shut in the dispensing condition, by moving the pinching edge towards a periphery of the hole in the rigid support structure wherethrough the flexible container extends, thereby shutting the flexible container above the pinching edge and inhibiting the remainder of the product in the flexible container to be dispensed.

The dispensing arm may include upper and lower prongs, with the upper prong defining the pinching edge and the lower prong defining the retaining surface.

The upper prong may include a hole therein, and the pinching edge may be defined by at least part of the periphery of the hole in the upper prong.

The flexible container may extend through the hole in the rigid support structure, and through the hole in the upper prong.

Movement of the dispensing arm may cause the hole therein to become offset from the hole in the support structure, thereby pinching the flexible container between the pinching edge and the periphery of the hole in the support structure, so as to shut the flexible container at the pinching edge.

The moveable dispensing arm may be arranged to dispense a predefined amount of product in the dispensing condition.

The moveable dispensing arm and actuator may further be arranged, in the dispensing condition, to move the retaining surface away from the bottom opening of the flexible container, thereby causing the predefined amount of product to be dispensed from the flexible container.

The predefined amount of product may be defined by a volume of the flexible container in a region between the pinching edge and the retaining surface.

The upper prong may define a wedge that terminates in the pinching edge. The lower prong may include a hole therein, wherethrough the product may be dispensed when the moveable dispensing arm is moved to the dispensing condition.

The dispensing arm may include two pinching edges, with an upper pinching edge arranged to pinch the flexible container shut at a location above its bottom opening in the dispensing condition, and a lower pinching edge arranged to pinch the flexible container shut at or near the bottom opening thereof in the retaining condition.

In the case of the dispensing arm including upper and lower prongs, the upper pinching edge may be defined by the upper prong and the lower pinching edge may be defined by the lower prong of the dispensing arm.

The predefined amount of product may be defined by a volume of the flexible container in a region between the upper pinching edge and the lower pinching edge.

The dispensing arm may be pivotable or rotatable by the actuator, such that the upper pinching edge pinches the flexible container shut when the dispensing arm is pivoted or rotated in a first direction and such that the lower pinching edge pinches the flexible container shut when the dispensing arm is rotated or pivoted in a second direction.

The rigid support structure may have a relatively flat bottom and a relatively flat top, so as to be stackable onto other dispensers for storage, for example when a plurality of dispensers are used together.

The actuator may be an electrically energized solenoid which may be operable to move the dispensing arm between the dispensing condition and the retaining condition.

The dispensing arm and actuator may be arranged, in the dispensing condition, to move the lower pinching edge away from the flexible container and the upper pinching edge towards the flexible container, thereby shutting the flexible container at the upper pinching edge and opening the flexible container near the lower pinching edge, so as to cause the predefined amount of product below the upper pinching edge to be dispensed from the flexible container.

The dispensing arm and actuator may be arranged, in the retaining condition, to move the lower pinching edge towards the flexible container and the upper pinching edge away from the flexible container, thereby shutting the flexible container at the lower pinching edge and allowing product inside the flexible container to settle towards the lower pinching edge.

The product may be any type of product capable of being held inside the flexible container, including, but not limited to, seasoning, spice, particulate material, condiment, a generally dry product, a generally wet product, a liquid or a paste.

In accordance with another aspect of the disclosure there is provided a dispensing unit comprising:
- a plurality of sockets, capable of receiving one or more dispensers as defined above;
- a plurality of actuators, with an actuator provided at each of the sockets; and
- a controller configured to select one of the dispensers for dispensing a product therefrom and to transmit a signal to the actuator of the selected dispenser, so as to actuate the selected dispenser from a retaining condition to a dispensing condition to dispense product therefrom.

In accordance with another aspect of the disclosure there is provided a dispensing system comprising:
- a controller which includes a memory for storing computer-readable program code and a processor for executing the computer-readable program code;
- at least one dispenser which includes:
    - a flexible container having a top and a bottom and capable of holding a product therein, the flexible container including top and bottom openings;
    - a rigid support structure that supports the flexible container; and
    - a moveable dispensing arm that operatively facilitates product dispensing; and
- an actuator which is controlled by the controller and operable to move the dispensing arm between a dispensing condition and a retaining condition, the dispensing arm including a pinching edge which is configured to pinch the flexible container shut in either the dispensing condition or the retaining condition of the dispensing arm.

The moveable dispensing arm may be arranged to retain product in the flexible container in the retaining condition.

The moveable dispensing arm may be arranged to dispense a predefined amount of product in the dispensing condition.

The system may further include a user device having a user interface thereat. The user device may be operable to receive user input through the user interface.

The user device may be a mobile device. The user device may be in data communication with the controller.

The user device may be operable to transmit the user input to the controller and the controller may, responsive to receiving the user input, be arranged to cause the actuator to dispense the product.

A software application may be downloadable onto and executable on the user device, to provide the user interface, and to enable a user to interact with the system.

The system may include a plurality of dispensers.

The user interface may be arranged such that the user is able to select one of the plurality of dispensers for dispensing the product therefrom.

The user interface may be colour coded. One or more colour coded buttons may be provided by the user interface and each of the colour coded buttons may correspond to one of the plurality of dispensers.

Each one of the plurality of dispensers may be colour coded corresponding to the colour coding of the relevant button on the user interface. An electric light emitting device may be provided to provide an indication of the selected dispenser, and the electric light emitting device may correspond to the colour coding of the relevant user interface button.

Each of the plurality of buttons on the user interface may have a dispensing value or a dispensing quantity displayed thereon. The dispensing value or quantity may be equal to an integer multiplier of the predefined amount of product dispensed by the relevant dispenser in the dispensing condition.

The controller may be configured to select a dispenser and its associated actuator, based on the user input, and the controller may transmit a signal to that actuator so as to actuate the selected dispenser to dispense product therefrom.

The system may include a dispensing unit for receiving each of the plurality of dispensers.

The plurality of dispensers may be removably attachable to the dispensing unit.

In accordance with another aspect of the disclosure there is provided a dispensing method comprising:

providing one or more dispensers, each including:
- a flexible container having a top and a bottom and capable of holding a product therein, the flexible container including top and bottom openings;
- a rigid support structure that supports the flexible container; and
- a moveable dispensing arm that operatively facilitates product dispensing by moving between a dispensing condition and a retaining condition, the moveable dispensing arm including a pinching edge which is configured to pinch the flexible container shut in either the dispensing condition or the retaining condition of the moveable dispensing arm; and in use, causing the moveable dispensing arm to be moved between the dispensing condition and the retaining condition.

The method may include implementing a controller which includes a memory for storing computer-readable program code and a processor for executing the computer-readable program code.

The method may include implementing an actuator and controlling the actuator by the controller, so as to move the dispensing arm between the dispensing condition and the retaining condition.

The method may further include providing a user device having a user interface thereat. The method may include receiving user input through the user interface.

The user device may be a mobile device. The method may include enabling the user device to be in data communication with the controller.

The method may include receiving the user input by the controller, and responsive to receiving the user input, transmitting a signal to the actuator to dispense the product.

A software application may be downloadable onto and executable on the user device, to provide the user interface, and to enable a user to interact with the controller.

The method may include providing a plurality of dispensers.

The method may include enabling the user to select one of the plurality of dispensers for dispensing the product therefrom.

The method may include providing a colour coded user interface. The method may further include providing one or more colour coded buttons with the user interface. The method may include arranging the user interface so that each of the colour coded buttons corresponds to one of the plurality of dispensers.

The method may include arranging each one of the plurality of dispensers so as to be colour coded corresponding to the colour coding of the relevant button on the user interface.

The method may include providing an electric light emitting device to provide an indication of the selected dispenser, and the electric light emitting device may correspond to the colour coding of the relevant user interface button.

The method may include arranging the user interface such that each of the plurality of buttons on the user interface has a dispensing value or a dispensing quantity associated therewith. The dispensing value or quantity may be equal to an integer multiplier of the predefined amount of product dispensed by the relevant dispenser in the dispensing condition.

The method may include, by the controller, selecting a dispenser and its associated actuator, based on the user input, and transmitting a signal to that actuator so as to actuate the selected dispenser to dispense product therefrom.

The method may include implementing a dispensing unit for receiving each of the plurality of dispensers. The plurality of dispensers may be removably attachable to the dispensing unit.

Embodiments of the invention will now be described, by way of example only, with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 27 illustrates example excerpts of code implementing the exemplary protocol as described by the present disclosure.

DETAILED DESCRIPTION WITH REFERENCE TO THE DRAWINGS

Nomenclature

Figure 1:
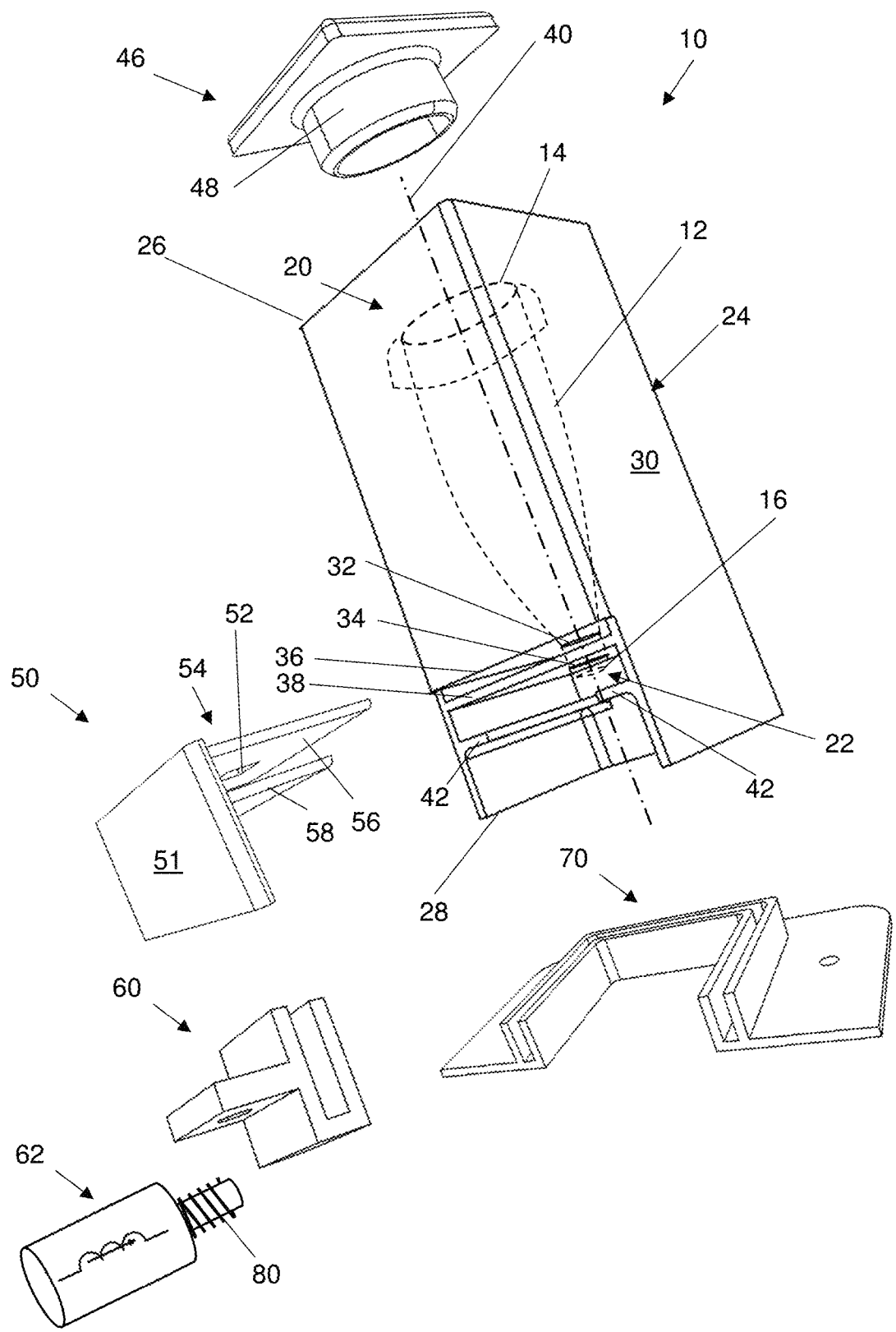
FIG. 1 is a three-dimensional exploded view of a dispenser according to an exemplary embodiment of the present disclosure.

In this specification, the following acronyms, abbreviations or terms may be used:

Acronyms and Abbreviations

ASCII American Standard Code for Information Interchange
GPIO General Purpose Input/Output
I2C Inter-Integrated Circuit
LED Light Emitting Diode
L-R Left to Right
LSB Least Significant Bit
MWBP Mobile Web Best Practices
MOSFET Metal Oxide Silicon Field Effect Transistor
RGB Red Green Blue
SPI Serial Peripheral Interface
UI User Interface
UART Universal Synchronous/Asynchronous Receiver/Transmitter
WCAG Web Content Accessibility Guidelines Moreover, the phrase "SpiceBot" may be used to refer to an exemplary dispenser, a dispensing system and a dispensing method according to the present disclosure. However, it will be appreciated that other types of products that are not limited to spices may be dispensed.

Variables and Functions

Button Set
$d_B$ Button Distance
$f_M$ Measurement Frequency
M Measurement Set
S Weighted Sum There is provided a dispenser, a dispensing system and a dispensing method. The dispenser may include a frame which supports a flexible bladder or container that may be capable of holding a substance therein. One or more dispensers may form part of the system, and a housing unit may be provided with a plurality of receiving formations for receiving one or more of the dispensers. Each dispenser may for example have a different type of substance therein. The substance may be granular material, but it may also be a liquid, a gel, a paste or particulate material. The dispenser may find particular application for use with foodstuffs, but other types of products or substances may also be dispensed. Each dispenser may include a dispensing mechanism or a dispensing member, or a dispensing arm which may be arranged to impinge the flexible bladder to either retain the substance in the bladder or to release the substance from the bladder. The substance may be released as result of gravity and/or as result of the flexibility of the bladder and/or as result of the impingement by the dispensing member. The amount of substance may be predefined by a volume of the flexible container in a region between a retaining point and an impinging point or pinched point. The flexible container may be arranged and/or the dispensing arm may be shaped such that movement of the dispensing arm causes the flexible container to deform, thereby facilitating product to be dislodged or released from an inner wall of the flexible container. Such deformation may facilitate refilling of the predefined volume.

The dispensing member may be moved, for example by an automatic actuator. However, embodiments may be possible wherein the dispensing member or arm is moved by an electric motor, or even manually. A control system may be implemented to control each of the dispensers and to enable a user to select one of the dispensers to dispense the substance therefrom. The control system may include a microcontroller or processor. The microcontroller may parse a received data word. A portion of the word may indicate the type of data received. A portion of the word may indicate a value. For example, the word may be an ASCII character, with a first nibble indicating the character denotes a command and the second nibble indicating which command must be performed. Commands may be implemented on the associated control pins of the microcontroller by applying bitwise operations, such as bitmasking (described in more detail below), to the registers in which the associated control pins are located.

The dispensing system may further include a user interface with buttons or other input components. The buttons may be arranged such that the paths of most likely sequences are minimized. The buttons may be colour-coded. In some embodiments, the user interface may be a lever or button locatable on the device. The lever or button may be positioned so as to be actuated by a receiving container. In other embodiments, the user interface may be contactless. For example, a contactless user interface may comprise a proximity sensor.

Figure 2:
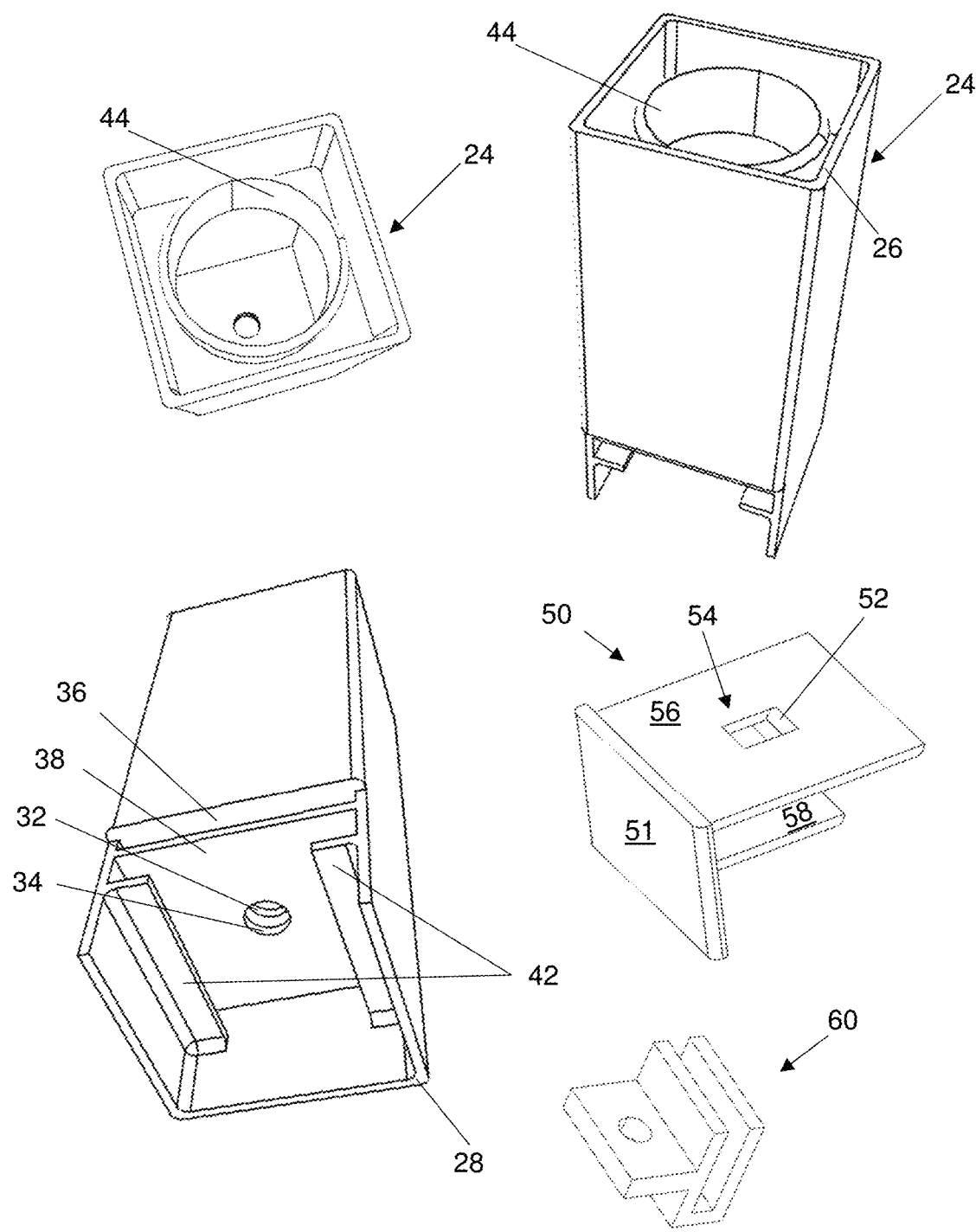
FIG. 2 shows three dimensional views of various components of the dispenser of FIG. 1.
Figure 3:
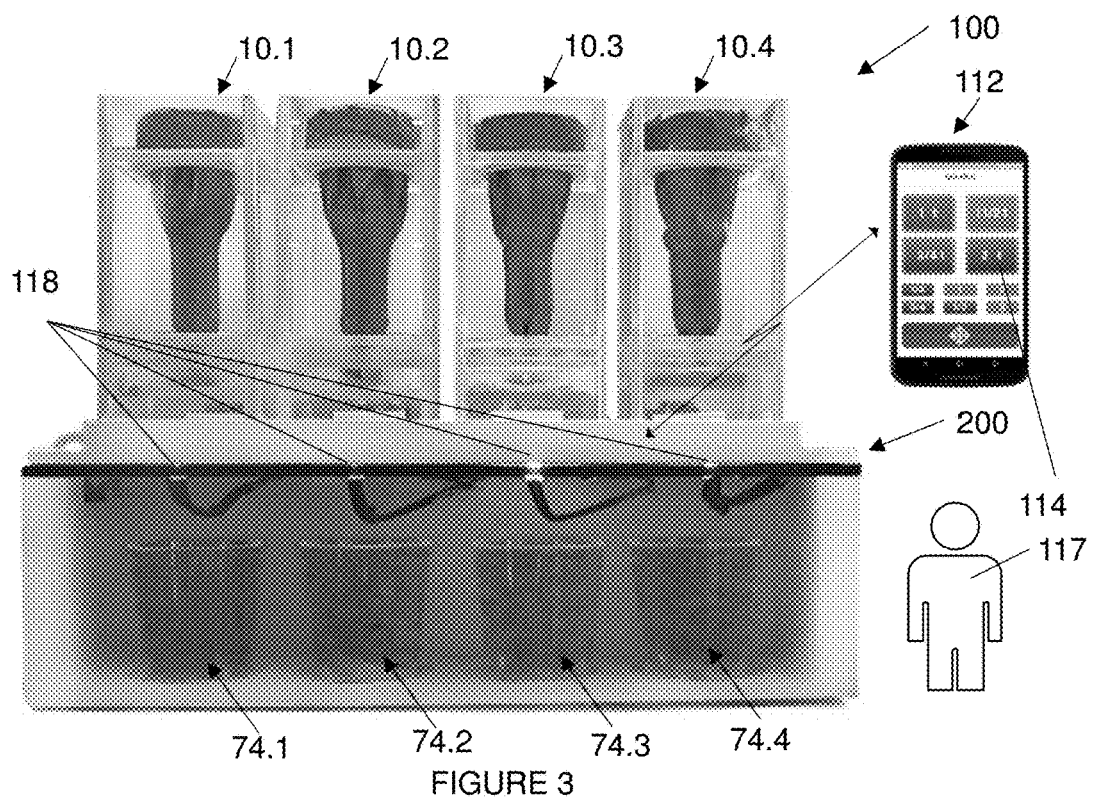
FIG. 3 is a photograph that shows a front view of an example embodiment of a dispensing system that includes a plurality of dispensers and also showing an exemplary user device that may be used with the dispensing system.
Figure 4:
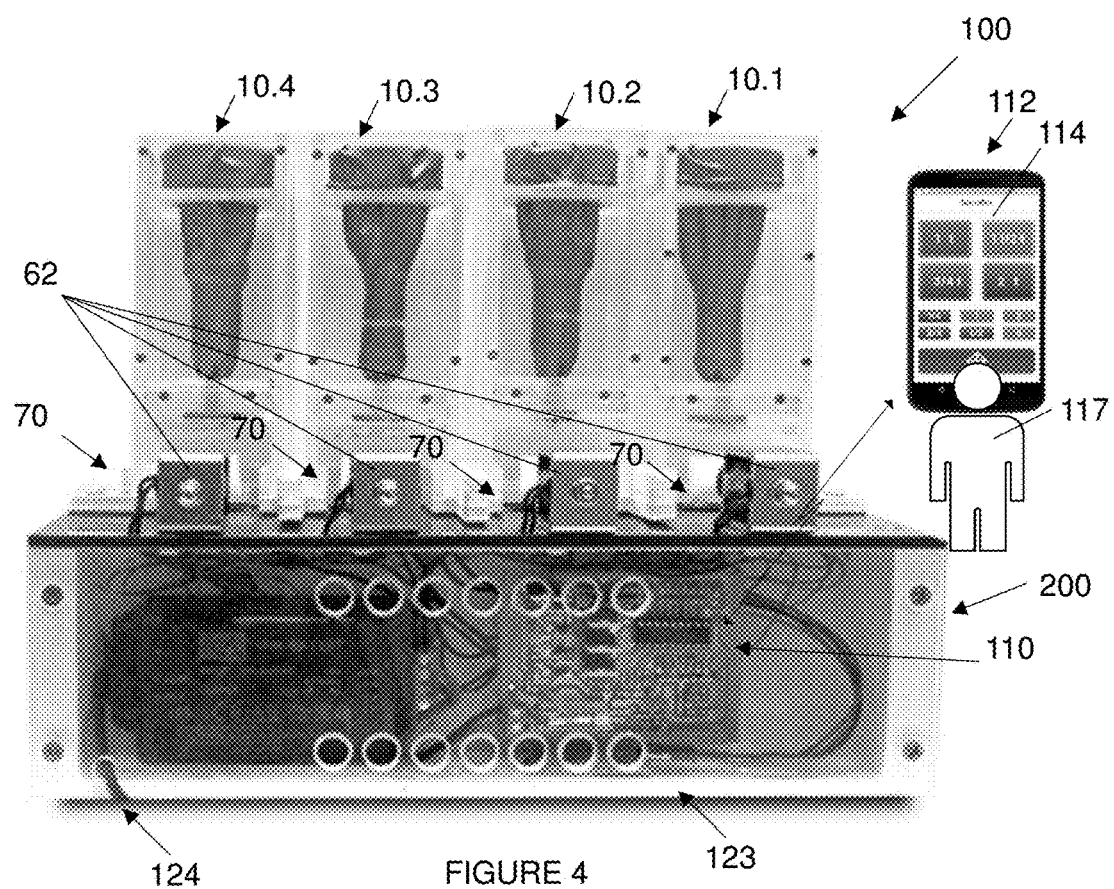
FIG. 4 is a photograph showing a back view of the dispensing system of FIG. 3.
Figure 5:
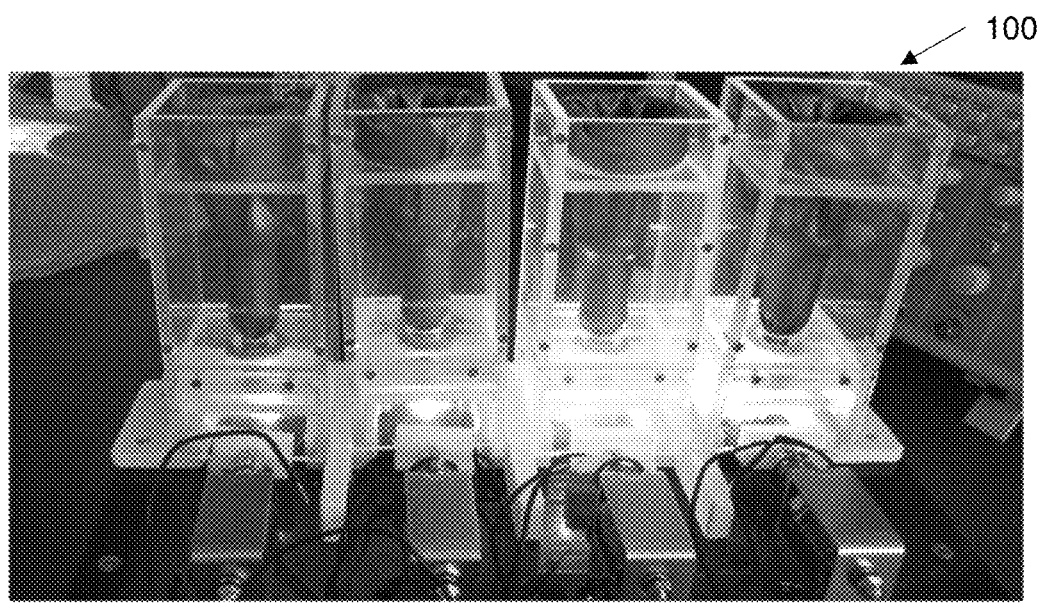
FIG. 5 is another photograph of the dispensing system of FIG. 3.
Figure 24:
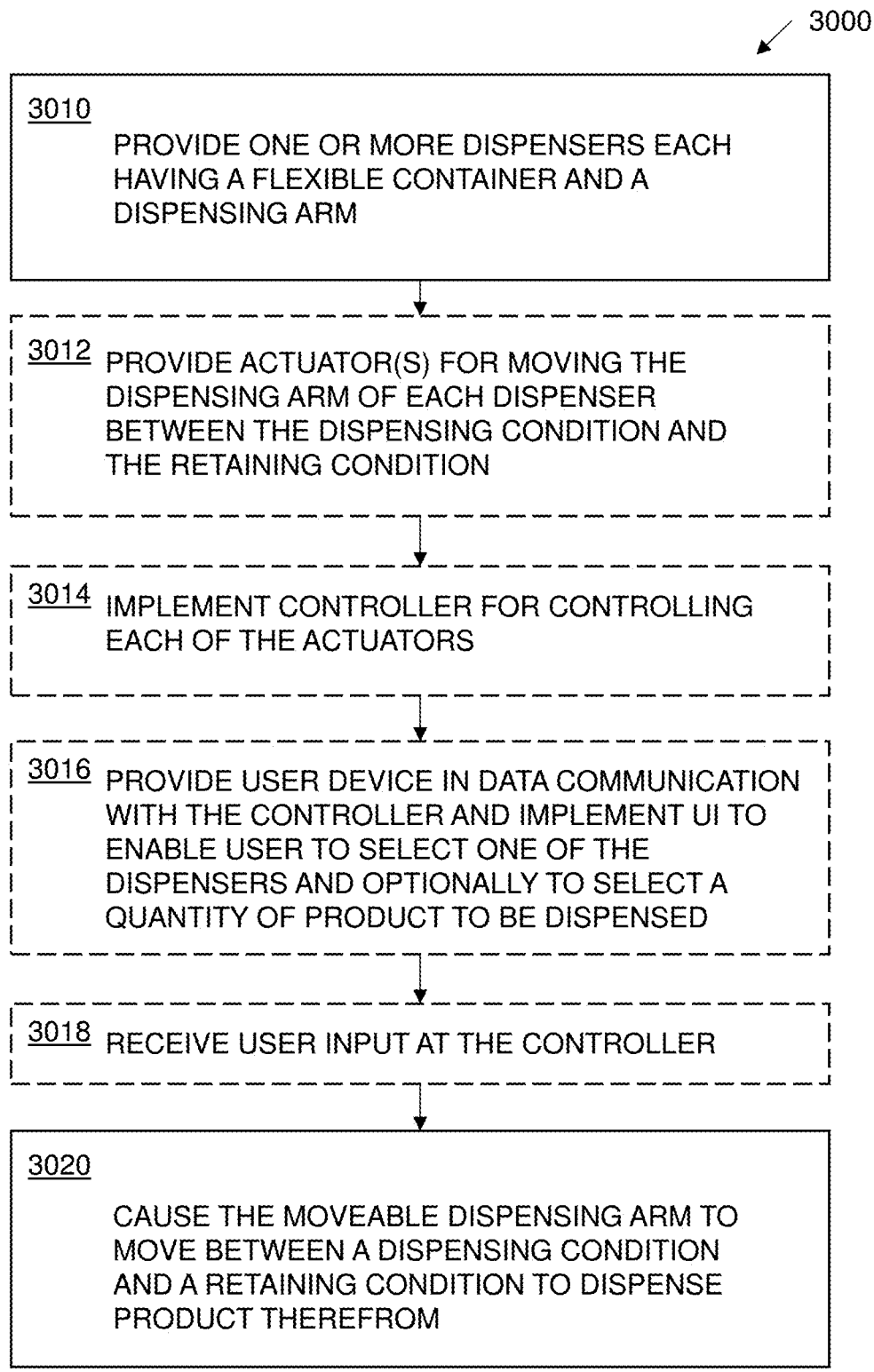
FIG. 24 is an exemplary dispensing method in accordance with the present disclosure.

An example embodiment of a dispenser according to the present disclosure is shown in FIGS. 1 and 2. A similar embodiment of the dispenser is shown in FIGS. 8-12. An exemplary dispensing system is shown in FIGS. 3-5 and an exemplary dispensing method is shown in FIG. 24. Further features of the present disclosure will now be described in more detail.

Referring to FIGS. 1 and 2, there is shown an example embodiment of a dispenser (10). In the present embodiment, the dispenser (10) includes a flexible container (12). The flexible container may resemble a balloon which has a portion of its top cut off. The flexible container has a top (14) and a bottom (16), and is capable of holding a product (18) therein (see the sectional views in FIGS. 11 and 12). The flexible container (12) may further include top and bottom openings (20, 22). A rigid support structure (24) is preferably provided, that supports the flexible container (12) in use. The rigid support structure (24) includes a top (26), a bottom (28) and a sidewall (30). In this example embodiment, a first hole (32) is provided in the rigid support structure (24), as well as a second hole (34) which may be concentric with the first hole. The flexible container or bladder may extend through both the first and second holes (32, 34) in the rigid support structure (24) (see also the three-dimensional lower view in FIG. 2). In this embodiment, the first hole (32) may be provided in a base portion (36) of the rigid support structure (24) and the second hole (34) may be provided in a spaced transverse portion (38) or beam of the rigid support structure (24). The dispenser (10) may extend generally along a major axis (40). The rigid support structure may further include transversely extending flanges (42). The flexible container (12) is preferably provided inside the rigid support structure (24) and is shown by broken lines in FIG. 1. In the exemplary embodiment, the flexible container (12) may be folded over a rim (44) near the top (26) of the rigid support structure so as to support the flexible container (12). The top (14) of the flexible container (12) may be located at the rim (44). The rim (44) is shown in more detail in the three-dimensional top views of the rigid support structure (24) in FIG. 2. The top (26) of the rigid support structure (24) may be generally open and a closure (46) may optionally be provided for the top (26) of the rigid support structure (24). The closure (46) may have a rim (48) which may be arranged to fit inside the rim (44) or opening of the rigid support structure (24), so as to seal the top opening (14) of the flexible container (12) and any product therein (see the sectional views in FIGS. 11-12). The rigid support structure (24) may thus have a hole (32) therethrough, wherethrough the flexible container (12) may extend in use. The rigid support structure may have a plurality of holes (44, 32, 34) therethrough, wherethrough the flexible container (12) may extend in use. The rigid support structure (24) may have a relatively flat bottom (28) and a relatively flat top (26), so as to be stackable onto other dispensers for storage, for example when a plurality of dispensers are used together. It should be appreciated that the holes need not be circular; the holes may be any suitable shape and may include oval, oblong, rounded square or rectangular-shaped holes or apertures.

Figure 11:
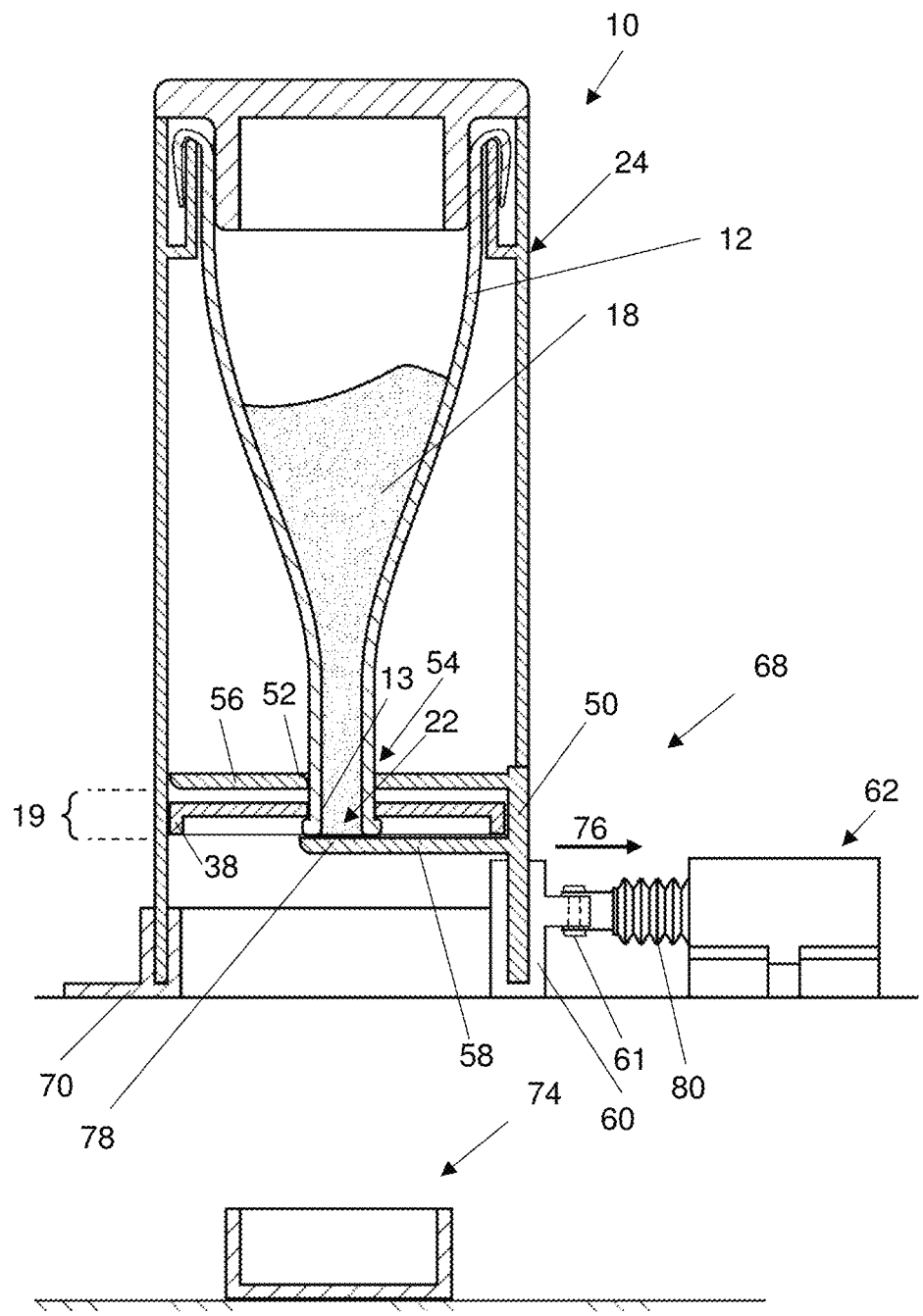
FIG. 11 is a sectional view taken along line XI-XI' in FIG. 9, also showing an exemplary receptacle for receiving dispensed product.
Figure 12:
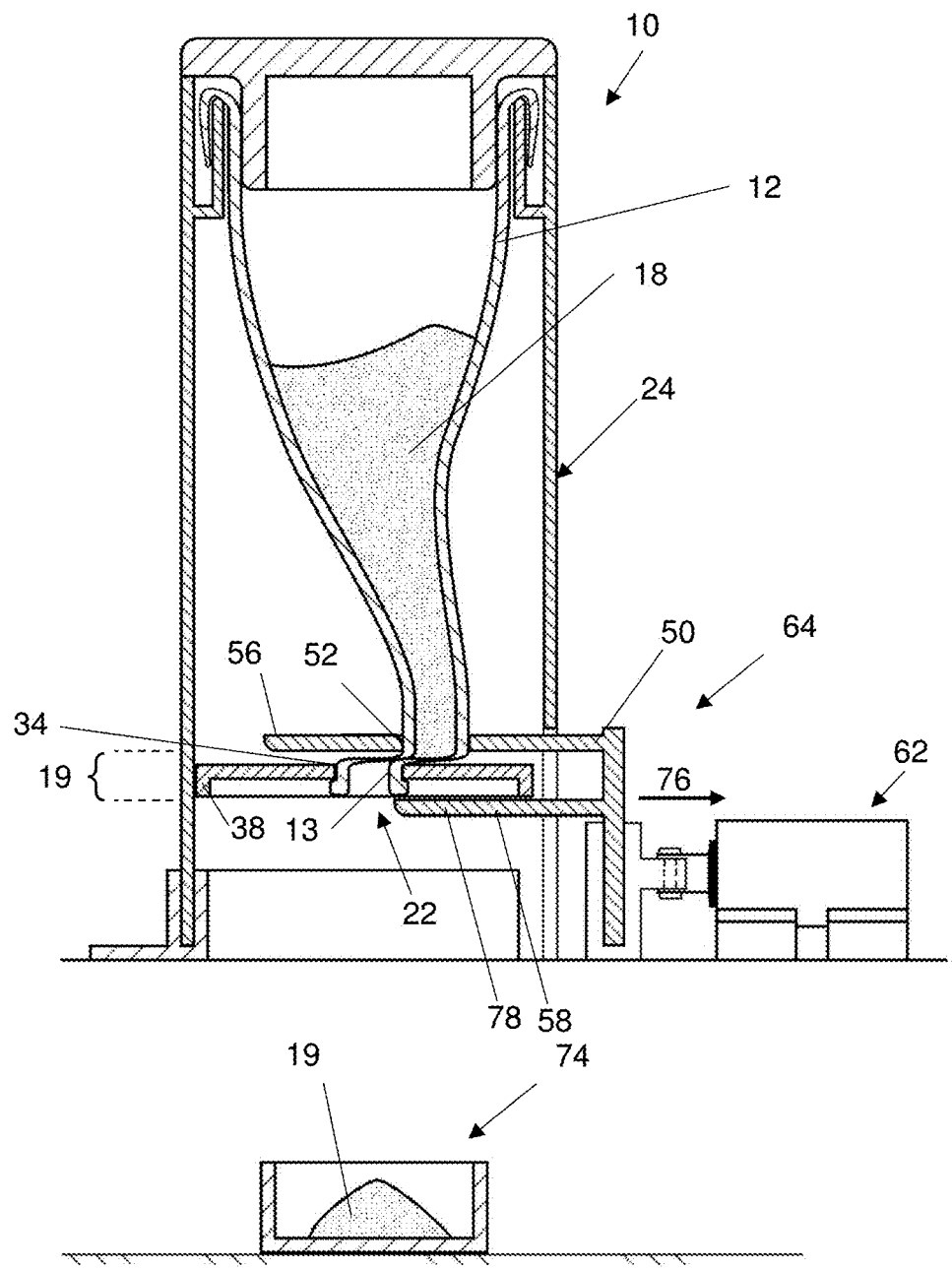
FIG. 12 is a sectional view taken along line XII-XII' in FIG. 10, showing product being dispensed in use.

A moveable dispensing arm (50) is provided and it may be arranged to operatively facilitate product dispensing. In the present embodiment, the moveable dispensing arm includes a pinching edge (52) that may be arranged to pinch the flexible container (12) shut. In the present embodiment, the pinching edge (52) is defined by part of a periphery of a hole (54) or aperture in the dispensing arm (50). The moveable dispensing arm (50) may include an upper prong (56) and a lower prong (58), and the hole (54) may for example be provided in the upper prong (56). The moveable dispensing arm (50) is operable between a dispensing condition (64) and a retaining condition (68) (see sectional views in FIGS. 11-12). The pinching edge (52) of the dispensing arm (50) may be arranged to pinch the flexible container shut in either the dispensing condition (64) or the retaining condition (68) of the dispensing arm (50). In the present embodiment, the pinching edge (52) of the dispensing arm (50) is arranged to pinch the flexible container (12) shut in the dispensing condition (64) as is shown in FIG. 12. However, an embodiment may be possible wherein the pinching edge is arranged to pinch the flexible container shut in the retaining condition as is diagrammatically illustrated in FIG. 25, which is described in more detail below.

Still referring to FIG. 1, a bracket or coupling device (60) may be provided to connect the moveable dispensing arm (50) to an electrically energized actuator (62) for moving the moveable dispensing arm between the dispensing condition and the retaining condition. An upright portion (51) of the moveable dispensing arm (50) may be receivable inside the bracket or coupling device (60). The coupling device may have a u-shaped recess to receive the upright portion (51) in use. The coupling device (60) may be fastened with a fastener (61) to the actuator (62) or solenoid (see the sectional view in FIG. 11). A cradle or socket (70) may further be provided to receive the dispenser (10) with its moveable dispensing arm (50). The cradle or socket (70) may form part of a dispensing unit (200), an example of which is shown in FIG. 3 which is described in more detail below. The dispensing unit (200) may include a plurality of sockets (70) for receiving dispensers (10.1 to 10.4) and a plurality of solenoids (62) may be provided as actuators to actuate the moveable dispensing arms of each of the dispensers (10.1 to 10.4). Each dispenser (10.1 to 10.4) may be removably attachable to the dispensing unit (200).

Figure 6:
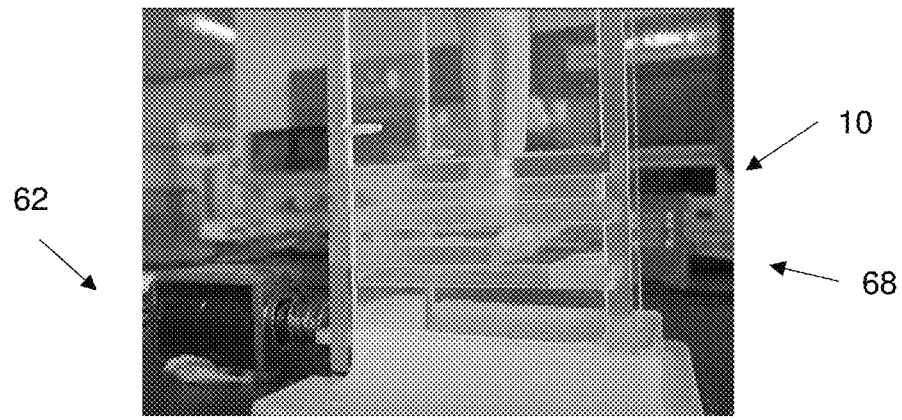
FIGS. 6-7 are photographs showing a dispenser and an electrically energized solenoid for operating a dispensing arm of the dispenser, to move the dispensing arm between a dispensing condition and a retaining condition.
Figure 7:
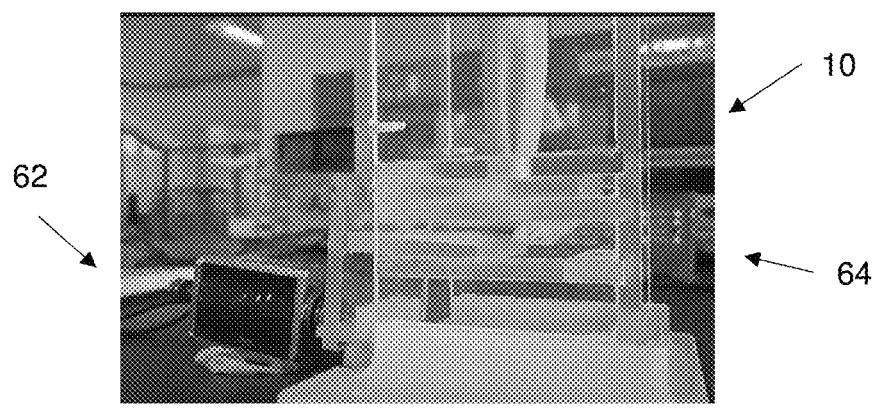

The moveable dispensing arm (50) may, in use, be moved by an actuator (62), for example the electrically energized solenoid, operable to move the dispensing arm between the dispensing condition and the retaining condition. FIGS. 3-5 show photographs of a dispensing system (100) according to an embodiment of the present disclosure. The system (100) is described in more detail below. FIGS. 6-7 are photographs showing an exemplary dispenser (10) and an electrically energized solenoid (62) for operating a dispensing arm of the dispenser, to move the dispensing arm between a dispensing condition (64) and a retaining condition (68).

Figure 8:
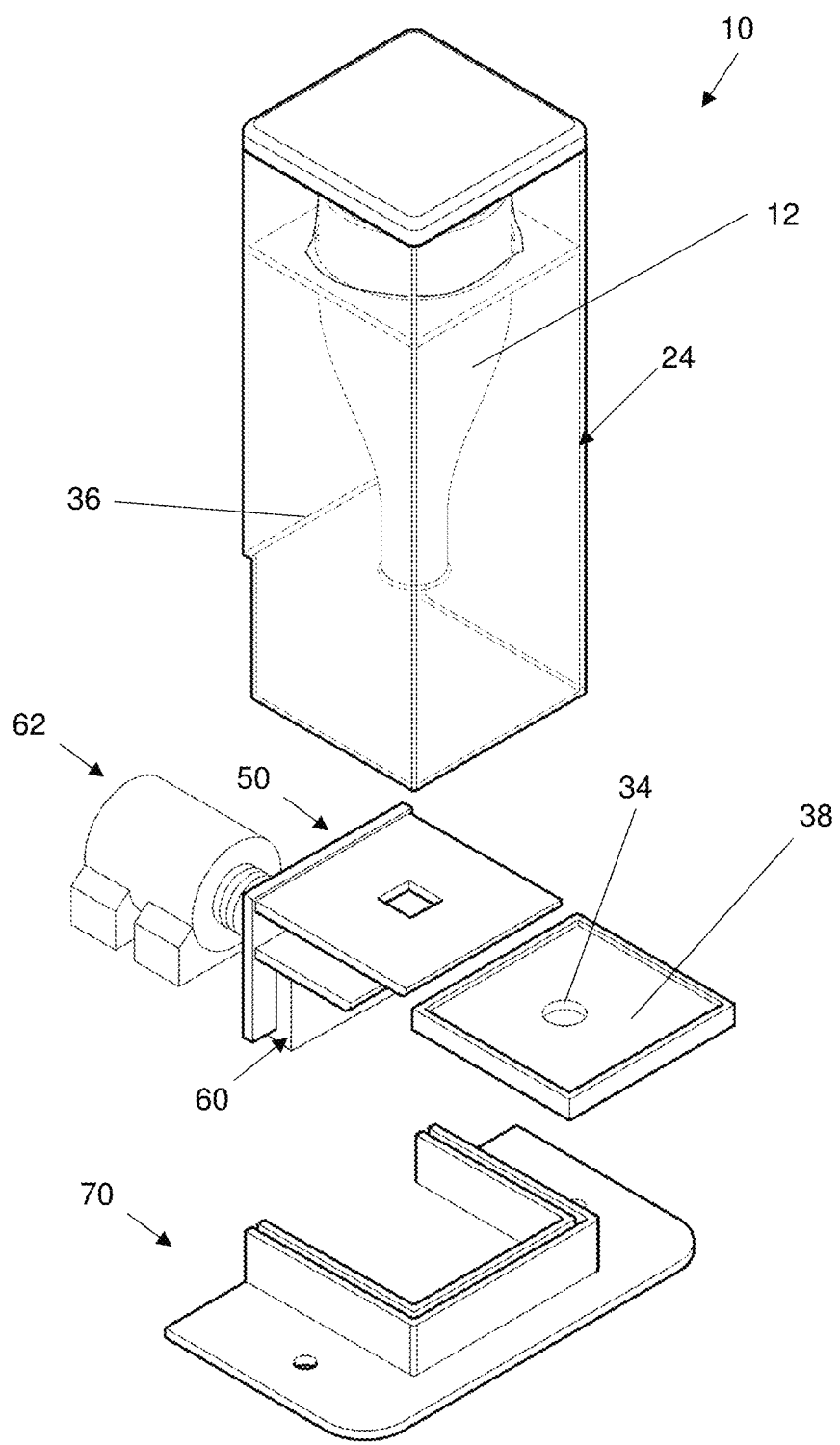
FIG. 8 is an exploded view of a dispenser according to another, albeit similar, exemplary embodiment of the present disclosure.

FIG. 8 shows an exploded view of an exemplary dispenser, similar to that shown in FIG. 1. However, in this embodiment, the spaced transverse portion (38) or beam of the rigid support structure (24) is a separate component that is attached, glued or fixed to the rigid support structure (24) (see the sectional view in FIG. 11). Moreover, in this particular embodiment, the rigid support structure (24) has a generally open base portion (36) and the hole (34) in the transverse portion or beam (38) is provided, but the first hole (32) in the base portion (36) is significantly larger (in other words, the base portion is generally open towards the bottom of the rigid support structure, and the hole (32) may span an entire bottom opening (36) of the base portion of the rigid support structure). The rigid support structure (24) is shown as translucent, so that its interior with the flexible container (12) can be seen. The rigid support structure (24) may be made from any rigid material, but in the photographs it is made from transparent Perspex®, so that the interior is visible. It will be appreciated that any rigid material may be used to manufacture parts of the dispenser such as plastics, polymers, metals, composites etc.

Figure 9:
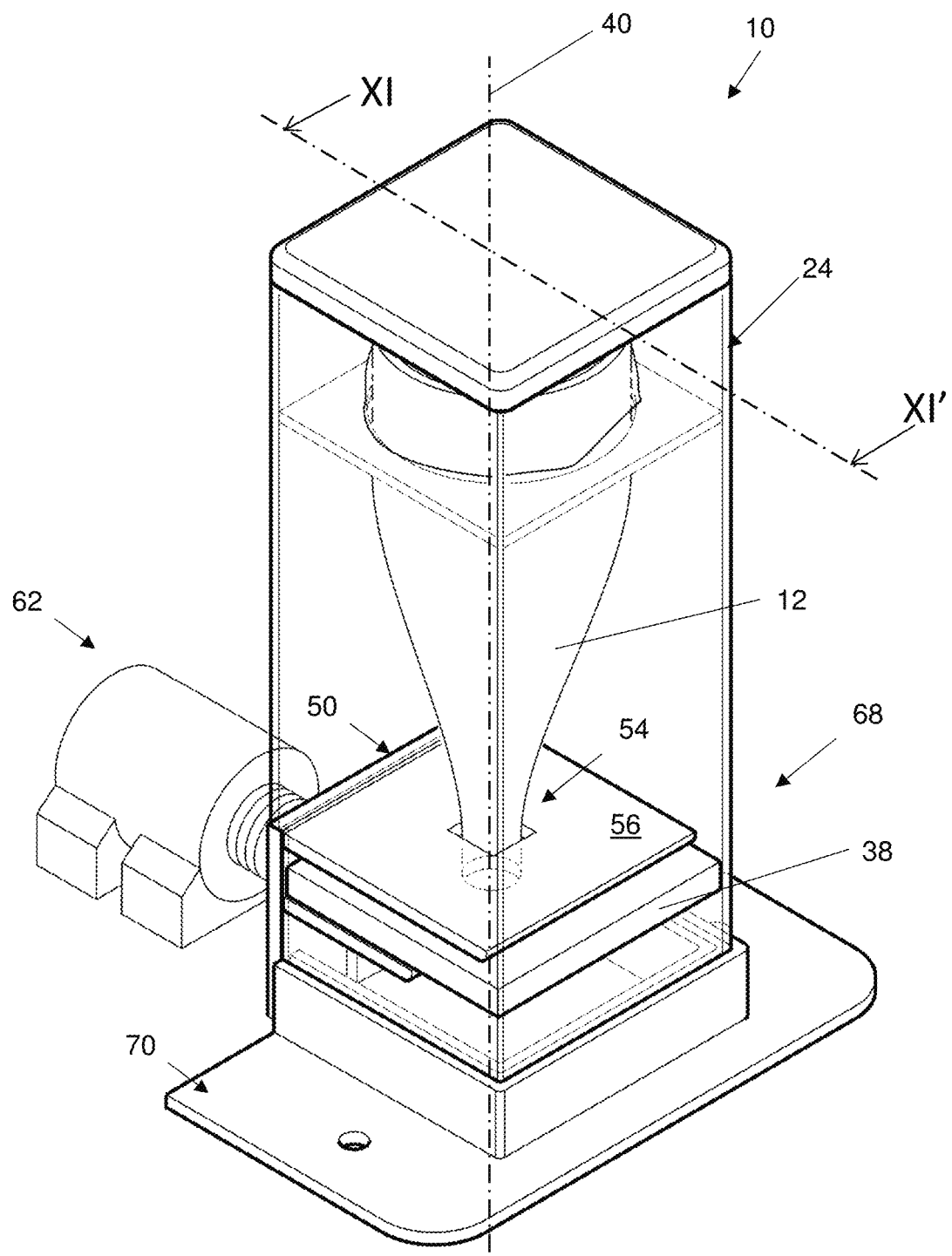
FIG. 9 shows the dispenser of FIG. 8 assembled and the dispensing arm in a retaining condition.

FIG. 9 shows the dispenser (10) of FIG. 8 in an assembled state, with its moveable dispensing arm (50) in the retaining condition (68). A sectional view taken along line (XI-XI') in FIG. 9 is shown in FIG. 11, which also shows an exemplary removable receptacle (74) for receiving product (18) after it is dispensed. The exemplary retaining condition (68) is seen in more detail in the sectional view of FIG. 11. Still referring to FIG. 11, the dispensing arm (50) (also shown in FIGS. 1-2) may include a retaining surface (78) arranged to substantially close the bottom opening (22) of the flexible container (12) in the retaining condition (68) of the dispensing arm (50). The dispensing arm (50) may include upper and lower prongs (56, 58), with the upper prong (56) defining the pinching edge (52) and the lower prong (58) defining or including the retaining surface (78).

The upper prong may include the hole (54) therein, and the pinching edge (52) may be defined by at least part of the periphery of the hole in the upper prong (56). The flexible container (12) may extend through the hole (34) in the rigid support structure (24) (and optionally also through the hole (32) shown in FIG. 1), and through the hole (54) in the upper prong (56). Movement of the dispensing arm (50) may cause the hole (54) therein to become offset from the hole (34) in the rigid support structure (24), thereby pinching the flexible container (12) between the pinching edge (52) and the periphery of the hole (34) in the support structure (24) (as seen in FIG. 12), so as to shut the flexible container (12) at the pinching edge (or at least to substantially shut the flexible container at the pinching edge). The moveable dispensing arm (50) may be arranged to dispense a predefined amount (19) of product in the dispensing condition (64). The predefined amount of product may be a predefined volume of product, for example one teaspoon of the product or about 5 ml of the product. Alternatively, the predefined amount of product may be a smaller amount such as ¼ of a teaspoon (tsp) or about 1.25 ml. Integer multiples of the predefined amount of product may be dispensed, such as a ½ teaspoon (about 2.5 ml), ¾ teaspoons (about 3.75 ml), 1½ teaspoons (about 7.5 ml), 2 teaspoons (about 10 ml), and 3 teaspoons (about 15 ml). Other values, quantities or amounts may also be possible. These amounts may also be displayed on the UI of a user device (112) which is described in more detail below.

Embodiments are also possible wherein one actuation of the actuator and one movement from the retaining condition to the dispensing condition dispenses ¼ teaspoons of product (i.e. about 1.25 ml), and if one teaspoon or 5 ml is required, then the actuator would actuate four times. Larger quantities may also be dispensed, for example by adjusting or configuring the volume of the portion (19) of the flexible container that is located between the pinching edge (52) and the retaining surface (78). Hence, the moveable dispensing arm (50) may be arranged to dispense a predefined amount (19) of product (18) in the dispensing condition (64). The moveable dispensing arm (50) and actuator (62) may further be arranged, in the dispensing condition (64), to move the retaining surface (78) away from the bottom opening (22) of the flexible container (12), thereby causing the predefined amount (19) of product (18) to be dispensed from the flexible container (12). The predefined amount (19) of product (18) may be defined by a volume of the flexible container (12) in a region (19) between the pinching edge (52) and the retaining surface (78).

Figure 10:
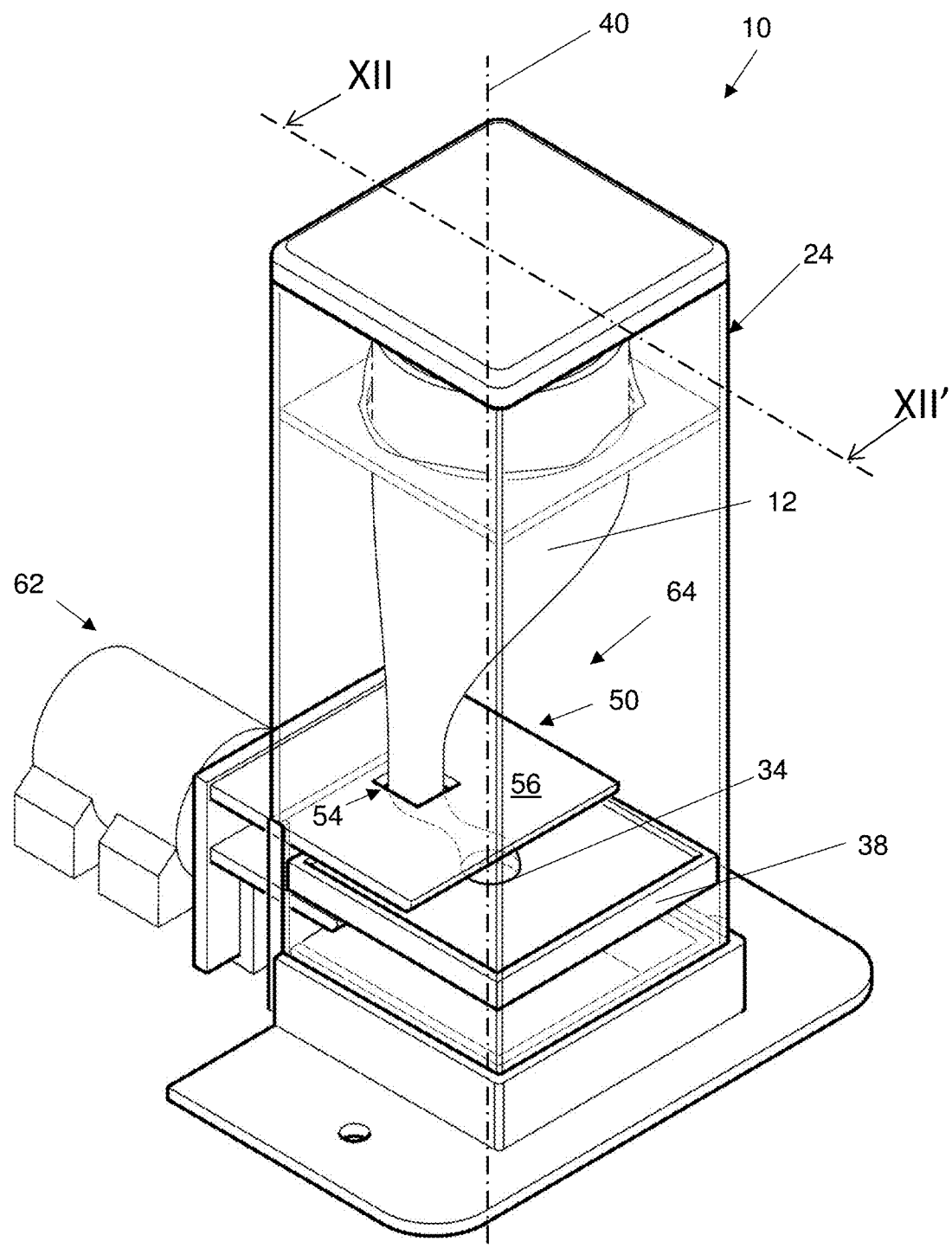
FIG. 10 shows the dispenser of FIG. 8 assembled and the dispensing arm in a dispensing condition.

FIG. 10 shows the dispenser (10) with its moveable dispensing arm (50) in the dispensing condition (64). As shown in FIGS. 9-10, in the present embodiment, the flexible container (12) may be arranged to extend through the hole (54) in the upper prong (56) of the moveable dispensing arm (50), as well as through the hole (34) in the rigid support structure (24) (in this case through the hole (34) in the transverse portion (38) or beam). It will be appreciated that the transverse portion or beam (38) may form part of the rigid support structure (24).

The flexible container (12) may be arranged such that movement of the dispensing arm (50) from the retaining condition (68) to the dispensing condition (64) causes the flexible container to elastically deform (see FIGS. 10 and 12), thereby facilitating product (18) to be dislodged or released from an inner wall (13) of the flexible container (12). Movement of the moveable dispensing arm (50) between the retaining condition (68) and the dispensing condition (64) is diagrammatically illustrated by the directional arrow (76) in FIGS. 11-12. This movement may for example be brought about by energizing the actuator (in this case a solenoid) by transmitting a signal to the solenoid (62). A controller (110) may be provided to transmit the signal to the solenoid, as will be described in more detail below with reference to the system (100) in FIG. 3. The solenoid (62) or actuator may be biased towards the retaining condition (68), for example by way of a spring (80) or biasing device (see FIG. 1). Embodiments may also be possible wherein the dispensing arm (50) itself is biased, either towards the retaining condition (68) or towards the dispensing condition (64), and the actuator or solenoid (62) may then push against (64) to either move the dispensing arm from the retaining condition to the dispensing condition, or the actuator may push against the bias to move the dispensing arm from the dispensing condition to the retaining condition. One or more springs, magnets or other biasing means (not shown) may be provided to bias the dispensing arm in this way.

Referring again to the embodiment shown in FIG. 12, in use, the dispensing arm (50) and actuator (62) may be arranged to pinch or clamp the flexible container (12) shut in the dispensing condition (64), by moving the pinching edge (52) towards a periphery of the hole (34) in the rigid support structure (24) (see FIG. 8) wherethrough the flexible container (12) operatively extends, thereby shutting the flexible container (12) at or near the pinching edge (52) and inhibiting the remainder of the product (18) in the flexible container (12) to be dispensed. The hole (34) in the transverse portion (38) may be regarded as a hole in the rigid support structure (24), because the transverse portion (38) may form part of the rigid support structure (24), or it may be fixed or adhered to the rigid support structure, or it may be integral therewith (as shown in the example embodiment in FIG. 1).

As is evident from FIG. 11, in the present embodiment, the moveable dispensing arm (50) may be arranged to retain product (18) in the flexible container (12) in the retaining condition (68). In use, the pinching edge (52) of the moveable dispensing arm (50) may pinch the flexible container shut. As seen in FIG. 12, the pinching edge (52) may be configured to pinch the flexible container (12) shut in the dispensing condition (64) at a location above the bottom opening (22) of the flexible container (12), so that any product (19) located operatively below the pinching edge may be dispensed. The product (19) operatively below the pinching edge (52) may be a predefined quantity of the product (18) inside the flexible container (12) or bladder. This is diagrammatically illustrated by the reference numeral (19) with broken lines and a curly brace in FIGS. 11-12. After the actuator (62) moves the moveable dispensing arm from the retaining condition (68) to the dispensing condition (64), the predefined quantity or amount of product (19) may simply fall from the bottom opening (22) of the flexible container (12) under the influence of gravity. However, the flexibility of the flexible container (12) may also facilitate any product (18) located on its inner wall (13) to become dislodged or to spring loose when actuation is performed.

Figure 13:
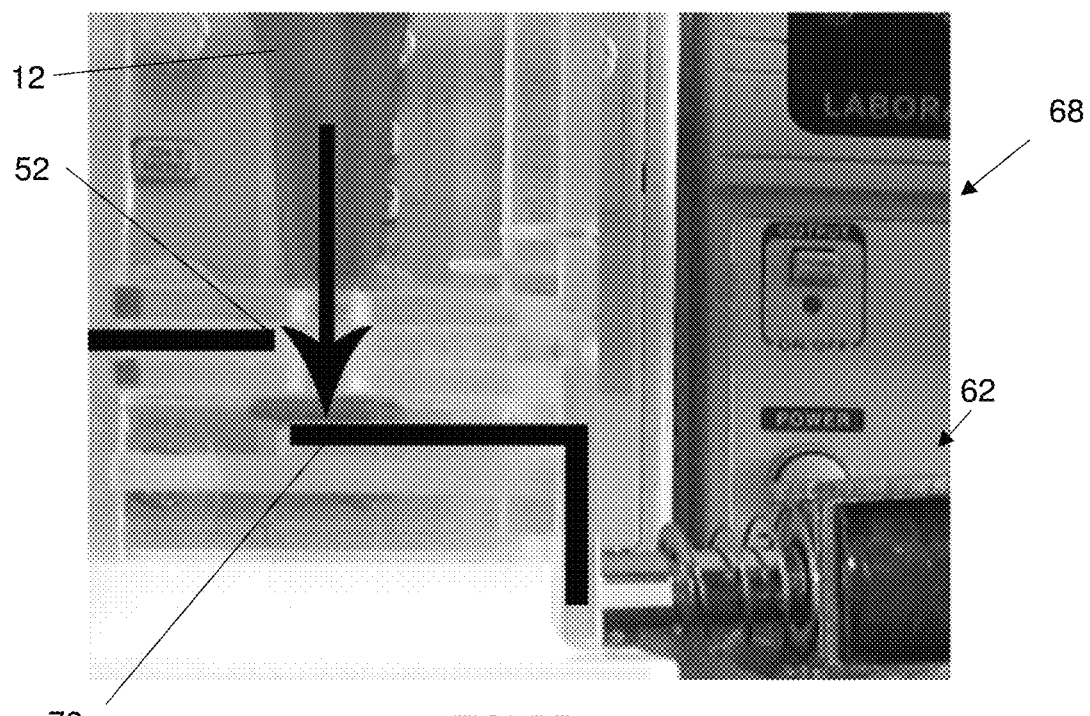
FIGS. 13-14 are annotated photographs illustrating an exemplary functionality of the dispensing arm and actuator.
Figure 14:
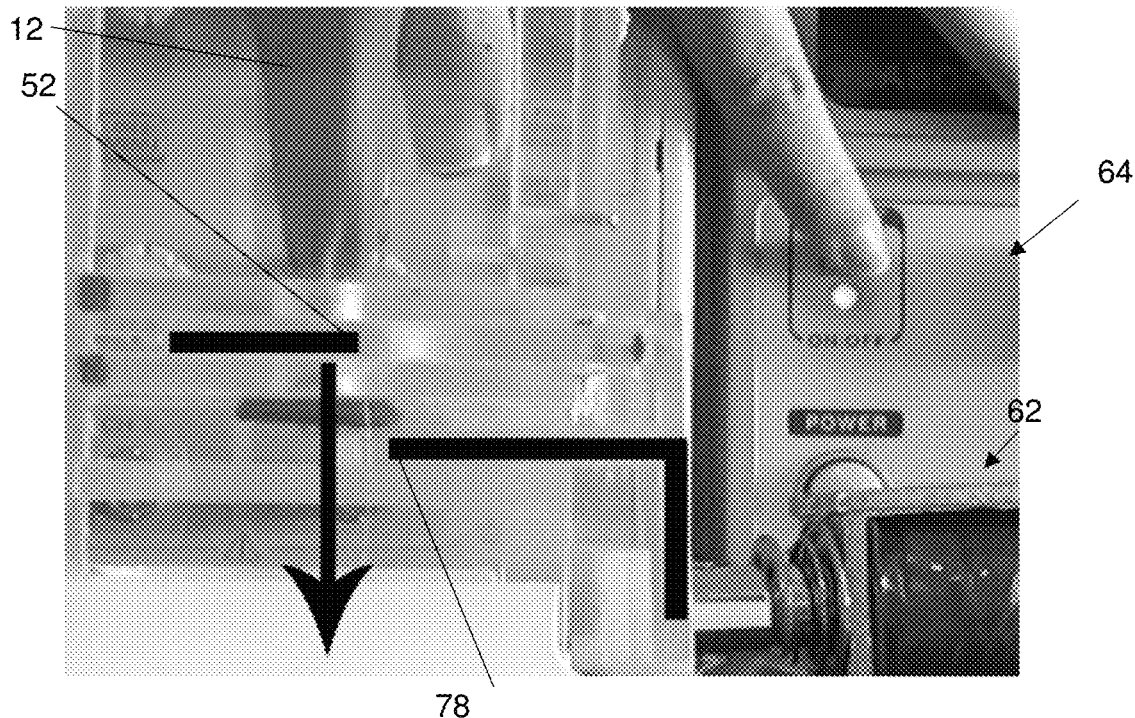

FIGS. 13-14 are annotated photographs illustrating an exemplary functionality of the dispensing arm and actuator. In FIG. 13, the actuator (62) is in the retaining condition (68) and product is blocked from falling out by the retaining surface (78). The pinching edge (52) is in this case not performing pinching and is away from the flexible container (12), thereby allowing product to settle towards the bottom of the flexible container, but not falling out, as the bottom opening is blocked by the retaining surface (78). As seen in FIGS. 13-14, a drawer-like mechanism or moveable dispensing arm (50) may be controlled by a solenoid actuator (62) solidly mounted to a base (for example a part of the dispensing unit (200)). The solenoid (62) may be arranged to simultaneously pinch the bladder or flexible container (12) shut while removing a closure at its bottom opening, dispensing a set volume of the product. This motion may repeat until the correct amount has been dispensed, while the elastic bladder (12) may isolate the granules of the product (in the case of a dry product) from the rest of the mechanics. The action may be functionally equivalent to scooping with a small measuring spoon and scraping off the excess. When the drawer or moveable dispensing arm is pushed in, the spices, seasoning or product may be blocked at the bottom opening. When open, the bladder is pinched from the top, and the spices or product may flow out the bottom opening (or it may fall out).

In FIG. 14, the actuator (62) is moved to the dispensing condition (64), and the retaining surface (78) is moved away from the flexible container, and away from the closed or blocked bottom opening thereof, allowing an amount of product to fall out, or to be dispensed. In this case, the pinching edge (52) is performing pinching or clamping, and it shuts the flexible container to inhibit further product from falling out or being dispensed. The actuator (62) may be an electrically energized solenoid which may be operable to move the dispensing arm (50) between the dispensing condition (64) and the retaining condition (68).

In the various embodiments described herein, the product (18, 3018) may be any type of product capable of being held inside the flexible container (12, 3012), including, but not limited to, seasoning, spice, particulate material, condiment, a generally dry product, a generally wet product, a liquid or a paste.

FIGS. 3-4 show a dispensing system (100) according to an exemplary embodiment of the present disclosure. The dispensing system (100) may include a controller (110), preferably a microcontroller, which includes a memory for storing computer-readable program code and a processor for executing the computer-readable program code. The system (100) may further include at least one dispenser (10.1 to 10.4). In the present embodiment, four dispensers are provided, but any number of dispensers may be possible. Each dispenser (10.1 to 10.4) may be similar to the dispenser (10, 1010, 1011, 1019, 2000) described herein. The system (100) may include an actuator (62) which is controlled by the controller (110) and operable to move the dispensing arm (50) of the at least one dispenser (10.1 to 10.4) between the dispensing condition and the retaining condition. As mentioned above, each dispensing arm may include a pinching edge configured to pinch the flexible container shut in either the dispensing condition or the retaining condition of the dispensing arm. In the present embodiment, the actuator(s) is/are in the form of an electrically energized solenoid which is under electric control of the controller (110).

The system (100) may further include a user device (112) having a user interface (114) thereat. The user device (112) may be operable to receive user input through the user interface. In the present embodiment, the user device is a mobile device. The user device may be in data communication with the controller (110). The data communications may preferably be provided wirelessly, for example by using a Bluetooth® or Bluetooth Low Energy protocol, or another wireless transmission protocol. One or more (in this case four) removable receptacles (74.1 to 74.4) are provided for receiving dispensed product.

The dispensing unit (200) may be provided with a plurality of sockets (70) or cradles, capable of receiving one or more dispensers as defined by the present disclosure. A plurality of actuators (62) are arranged, with an actuator provided at each of the sockets (70). The moveable dispensing arm (50) of each dispenser may be arranged to slot into the bracket or connector (60) which may be provided at each actuator. The socket (70) may include notches therein for receiving bottom edges of the rigid support structure (24) of each dispenser (10.1 to 10.*n*), so that the dispenser may fit snugly in the socket (70). The controller (110) may be arranged to select one of the dispensers (10.1 to 10.4) for dispensing a product (18) therefrom and to transmit a signal to the actuator (62) of the selected dispenser, so as to actuate the selected dispenser (10.1 to 10.4) from a retaining condition to a dispensing condition to dispense product therefrom.

The user device (112) may be operable to transmit the user input to the controller (110) and the controller (110) may, responsive to receiving the user input, be arranged to cause the relevant actuator (62) to dispense the product (18). A software application may be downloadable onto and executable on the user device (112), to provide the user interface (114), and to enable a user to interact with the system (100). The user interface (114) may be arranged such that the user (117) is able to select one of the plurality of dispensers (10.1 to 10.4) for dispensing the product (18) therefrom.

Figure 18:
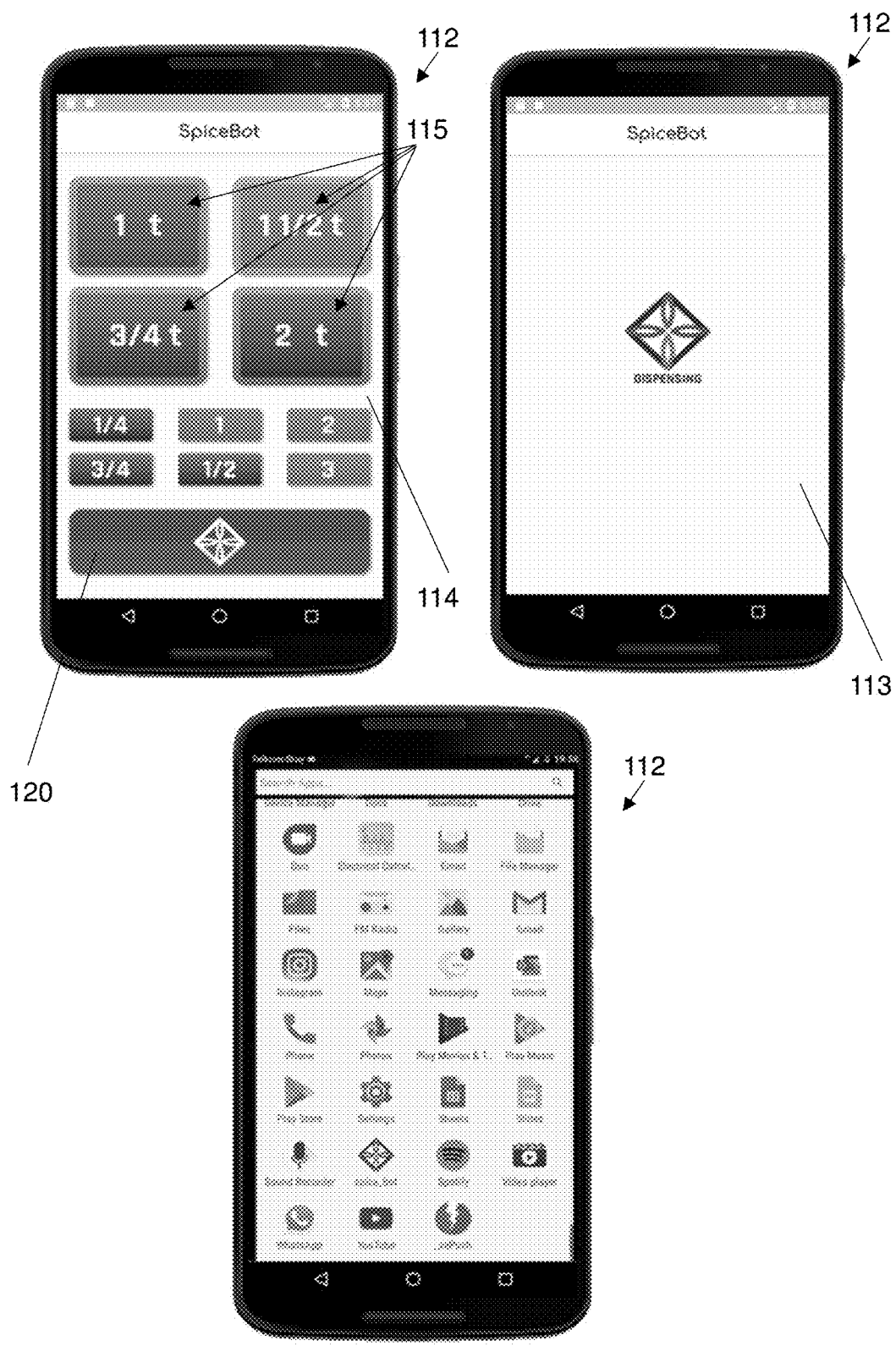
FIG. 18 shows example layouts of a user interface that may be implemented on a user device.

The user interface may be colour coded. An example of the user interface (114) is shown in FIG. 18. One or more colour coded buttons (115) may be provided by the user interface and each of the colour coded buttons (115) may correspond to one of the plurality of dispensers (10.1 to 10.4). Each one of the plurality of dispensers (10.1 to 10.4) may be colour coded corresponding to the colour coding of the relevant button (115) on the user interface (114). An electric light emitting device or LED (118) may be provided to provide an indication of the selected dispenser (10.1 to 10.4), and the electric light emitting device may correspond to the colour coding of the relevant user interface button (115). The LED of one of the dispensers (10.1 to 10.4) may light up when the user selects that dispenser. Alternatively, the dispensers may be labelled or physically coloured corresponding to the colours or labelling on the UI (114). Each of the plurality of buttons (115) on the user interface may have a dispensing value or a dispensing quantity displayed thereon. The dispensing value or quantity may be equal to an integer multiplier of the predefined amount of product dispensed by the relevant dispenser in the dispensing condition. For example, integer multipliers of ¼ teaspoons, or multiples of about 1.25 ml may be used, as shown in FIG. 18. Multiples of ¼, ½, ¾, 1, 2, or 3 teaspoons may be used. A user (117) may be enabled to modify the quantity of each button, before clicking or pressing a dispense button (120). A dispensing process may then be initiated by the controller (110), and the various dispensers (10.1 to 10.4) may perform actuation to dispense the required or selected amounts of product. It will be appreciated that each dispenser (10.1 to 10.4) may have a different product in its flexible container (12). The dispensers may also be swopped out and/or replaced with further dispensers (not shown), that may for example be stored by the user for use with the dispensing unit (200).

The controller (110) may be configured to select a dispenser (10.1 to 10.4) and its associated actuator, based on the user input received from the user device (112), and the controller may transmit a signal to that actuator so as to actuate the selected dispenser to dispense product therefrom. The system (100) may further include the dispensing unit (200) for receiving each of the plurality of dispensers. The dispensers (10.1 to 10.4) may be removably attachable to the sockets (70) in the dispensing unit (200).

Figure 23:
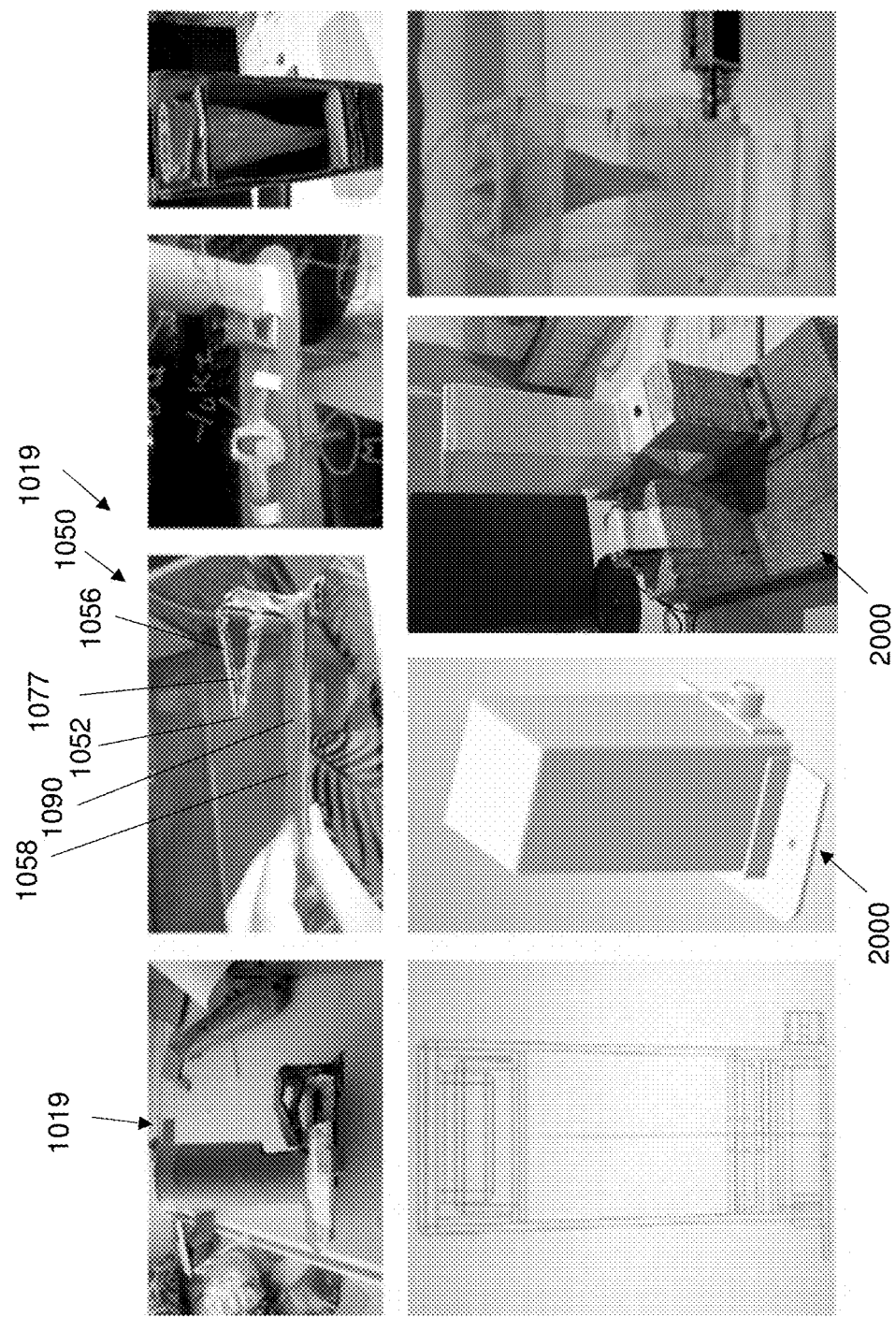
FIG. 23 shows a number of photographs of exemplary embodiments of dispensers according to the present disclosure.

In FIG. 23 is shown a number of photographs of prototypes of possible embodiments of dispensers according to the present disclosure. In one embodiment (1019), an upper prong (1056) of a moveable dispensing arm (1050) may define a wedge (1077) that terminates in the pinching edge (52). A lower prong (1058) may include a hole (1090) therein, wherethrough the product may be dispensed when the moveable dispensing arm is moved to the dispensing condition. The flexible container may be held by the rigid support structure in a similar way as described above, but its bottom opening may abut with the lower prong (1058), or a retaining surface thereof. This may close the bottom of the flexible container in the retaining condition of the dispensing arm (1056). In a dispensing condition, the moveable dispensing arm (1050) may be moved so that the pinching edge (1052) pinches the flexible container shut at a location above its bottom opening, and this movement may then align the bottom opening of the flexible container with the hole (1090) in the lower prong (1058) of the moveable dispensing arm, which may in turn cause product to be dispensed. A 3D printed version of yet another embodiment of a dispenser (2000) according to the present disclosure is also shown in FIG. 23. It may be possible to implement a moveable dispensing arm with one or more holes that are either aligned or offset relative to the hole in the rigid support structure (depending on whether the moveable dispensing arm is in the retaining or in the dispensing condition), such that movement of the moveable support structure causes different holes to align, causing pinching of the flexible container and/or causing either dispensing of product, or retaining of product, depending on the position of the moveable dispensing arm.

In FIG. 24 is shown an exemplary dispensing method (3000). One or more dispensers are provided (3010), each including a flexible container (12) and a dispensing arm (50). Optionally the method includes providing (3012) actuator(s) (62) for moving the dispensing arm (50) of each dispenser between the dispensing condition and the retaining condition. Further optionally, the method may include implementing a controller for controlling each of the actuators. A user interface may be provided (3016) at a user device in data communication with the controller. A UI may be implemented (3016) to enable a user (117) to select one of the dispensers and optionally to select a quantity of product to be dispensed. The method may further include receiving (3018) the user input at the controller. The method may yet further include, in use, causing (3020) the moveable dispensing arm to be moved between the dispensing condition and the retaining condition to dispense product therefrom. A software application may be downloadable onto and executable on the user device, to provide the user interface, and to enable a user to interact with the controller. The method may further include providing a plurality of dispensers. The method may also include enabling the user (117) to select one of the plurality of dispensers for dispensing the product therefrom.

The method (3000) may include providing a colour coded user interface. One or more colour coded buttons may be provided by the user interface. The method may include arranging the user interface so that each of the colour coded buttons corresponds to one of the plurality of dispensers. The method may include arranging or configuring each one of the plurality of dispensers, so as to be colour coded corresponding to the colour coding of the relevant button on the user interface. The method may also include providing an electric light emitting device to provide an indication of the selected dispenser, and the electric light emitting device may correspond to the colour coding of the relevant user interface button. The method may include arranging the user interface such that each of the plurality of buttons on the user interface has a dispensing value or a dispensing quantity associated therewith. The dispensing value or quantity may be equal to an integer multiplier of the predefined amount of product dispensed by the relevant dispenser in the dispensing condition. The method may include, by the controller (110), selecting a dispenser (10.1 to 10.$n$) and its associated actuator (32), based on the user input, and transmitting a signal to that actuator, so as to actuate the selected dispenser to dispense product therefrom. The method may further include implementing a dispensing unit (200) for receiving each of the plurality of dispensers (10.1 to 10.4). The present disclosure may provide an app-controller product dispensing machine.

Figure 25:
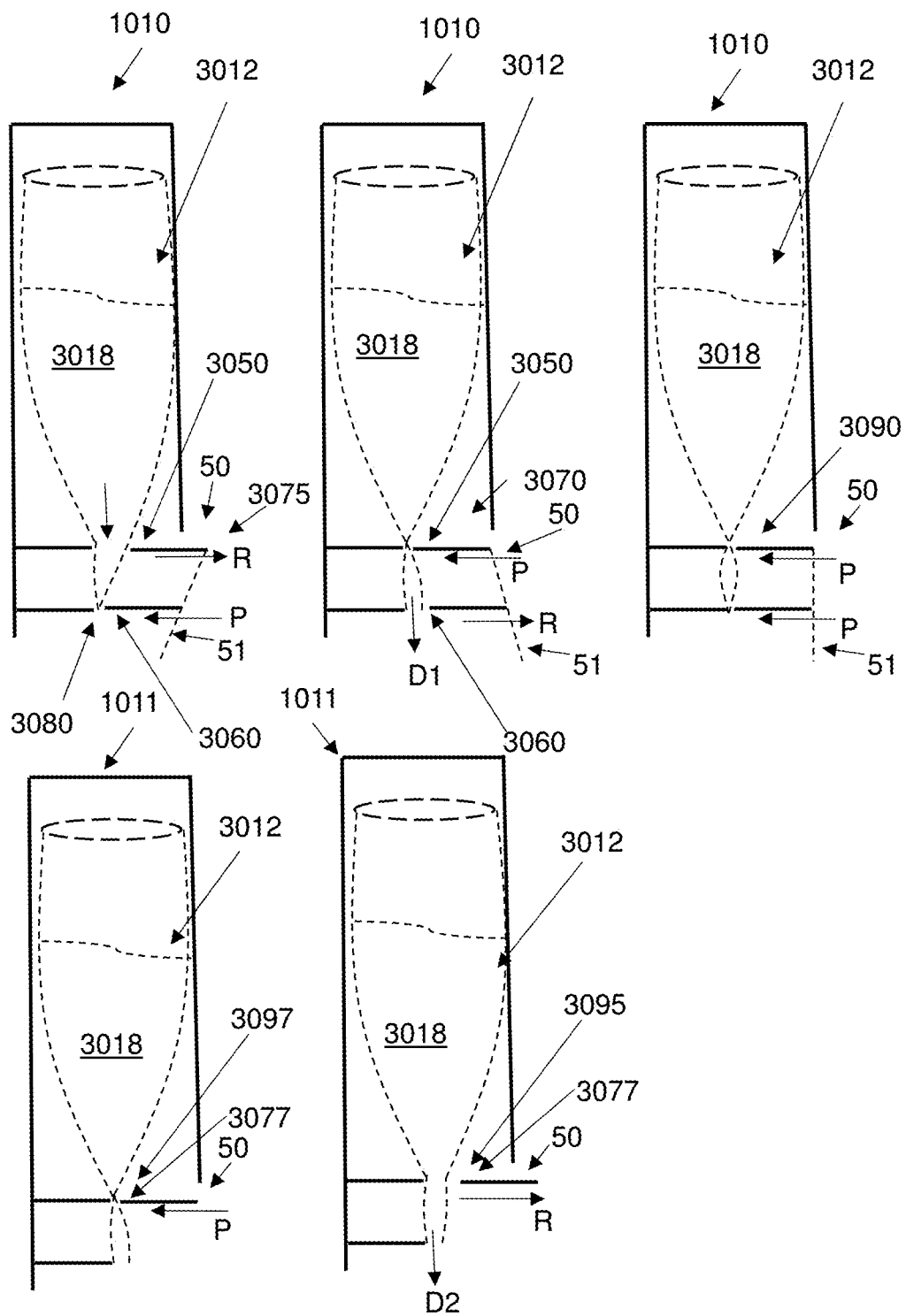
FIG. 25 is a diagrammatic representation of alternative embodiments of the moveable dispensing arm, illustrating how double pinching may be performed.

In FIG. 25 is shown a number of possible embodiments of dispensers (1010, 1011), or dispensing systems according to the present disclosure. Exemplary movement of the dispensing arm (50) is indicated by directional arrows ("P" for pinching and "R" for releasing). In an embodiment of the dispenser (1010), the dispensing arm (50) may include two pinching edges (3050, 3060), with an upper pinching edge (3050) arranged to pinch a flexible container (3012) shut at a location above its bottom opening (as shown at 3070) in the dispensing condition (as shown by the dispensing arrow D1), and a lower pinching edge (3060) arranged to pinch the flexible container shut (as shown at 3080) at or near the bottom opening thereof in the retaining condition. When the lower pinching edge (3060) pinches the container shut, the product (3018) therein may be allowed to settle towards the bottom thereof. In the case of the dispensing arm (50) including upper and lower prongs, the upper pinching edge (3050) may be defined by the upper prong and the lower pinching edge (3060) may be defined by the lower prong of the dispensing arm (50). Opposing projections may be provided by the rigid support structure as is shown in the lower left of each of the depicted dispensers. These opposing projections may (indirectly) engage each pinching edge during pinching and the flexible container may be pinched between the opposing projection and the pinching edge. Other embodiments are also possible wherein double pinching may be performed which is diagrammatically illustrated in FIG. 25 (at 3090). In other words, both the upper and lower pinching edges may pinch the container shut at different locations. The actuator may be arranged to move the upper and lower prongs independently of one another, and the lower pinching edge may be released, so that a predefined amount product may be dispensed. After this, the lower pinching edge may be returned to its pinching position, and the upper pinching edge may be released or moved away, so that the product (3018) may settle towards the bottom of the flexible container (3012). This process may then be repeated as necessary. Hence the pinching edge may be configured to pinch the flexible container at or near its bottom opening in the retaining condition of the dispensing arm, so as to inhibit more product from being dispensed. In this case, the predefined amount of product may be defined by a volume of the flexible container in a region between the upper pinching edge and the lower pinching edge.

Alternatively, in another embodiment (1011) of the dispenser, the moveable dispensing arm may include a single pinching edge (3077) and/or a single prong. In such a scenario it is envisaged that electrical timing may be implemented by a controller, to specify an amount of time that the moveable dispensing arm (50) is moved to the dispensing condition (at 3095 in FIG. 25) (which may open the bottom opening completely, without any pinching) and then pinching may be performed to close the flexible container near its bottom opening (as is diagrammatically shown at 3097). The quantity of product released may in such a scenario be related to the amount of time that the actuator moves the pinching edge (3077) away from the flexible container (3012).

Still referring to FIG. 25, the dispensing arm may be pivotable or rotatable by the actuator (not shown in this Figure), such that the upper pinching edge (3050) pinches the flexible container (3012) shut when the dispensing arm is pivoted or rotated in a first direction (e.g. at 3070) and such that the lower pinching edge pinches the flexible container shut when the dispensing arm is rotated or pivoted in a second direction (e.g. at 3075). In other words, the actuator may pivot the moveable dispensing arm (50) in a first direction (e.g. clockwise at 3075) to perform retaining, and in a second and opposite direction (e.g. counter-clockwise at 3070) to perform dispensing. One or more pivots, joints or hinges may be implemented to facilitate this. For example, the upper and lower prongs may be pivotable, and an upright portion (51) (see FIG. 1) may be pivoted so as to actuate the pinching (P) or releasing (R) of the pinching edges. Alternatively, the moveable dispensing arm may be slideable and moveable between a pinching position (P) and a releasing position (R).

The actuator and other components of the system and dispenser are omitted from FIG. 25 for the sake of brevity. The dispensing arm (50) and actuator (62) may be arranged, in the dispensing condition, to move the lower pinching edge (3060) away (R) from the flexible container (see 3070) and the upper pinching edge (3050) towards the flexible container (3012), thereby shutting the flexible container at the upper pinching edge and opening the flexible container near the lower pinching edge, so as to cause the predefined amount of product below the upper pinching edge to be dispensed from the flexible container (3012). The dispensing arm (50) and actuator (62) may be arranged, in the retaining condition, to move the lower pinching edge (3060) towards (P) the flexible container (3012) and the upper pinching edge (3050) away (R) from the flexible container (3012), thereby shutting the flexible container at the lower pinching edge (3060) (see 3075) and allowing product (3018) inside the flexible container (3012) to settle towards the lower pinching edge (3060) (for example under the influence of gravity).

Referring again to FIGS. 1-14, there is thus provided a dispenser and a dispensing system which may have the ability to process four, easily interchangeable dispensers. The dispensers may for example be used for dry ingredients or products at a time without excessive motion required for the measurements. The dispensers may be arranged to at least work with sugar and/or salt, but many other types of ingredients or products may be possible. Each dispenser (10.1 to 10.4) may be substantially free of electrical components, since actuators that are external from the dispensers are used, and the controller is external of the dispensers, since the container may be housed in the dispensing unit (200). The user interface (114) may provide an intuitive and easy to use layout that may be accessible even to persons with limited ability. Using a mobile user device (112) may expand the potential for the dispenser, system and method of the present disclosure to function as a mobility assistant for users (117) with impaired mobility. As will become apparent from what follows, control code for the controller may be generalized to allow for future alterations without significant rewrites. Electrically, the dispenser and dispensing system may be relatively simple, so as to reduce cost and the possibility of component failure. The product (18), seasoning or spices may be relatively isolated from the actuator and other mechanics of the dispenser, seeing as the product is contained inside the flexible container. This may provide the advantage of avoiding or inhibiting mechanical inconsistency and wear of components of the dispenser and system. The spices, product (18) or ingredients may be isolated from the mechanics as much as possible to avoid or alleviate mechanical inconsistency and wear.

Figure 15:
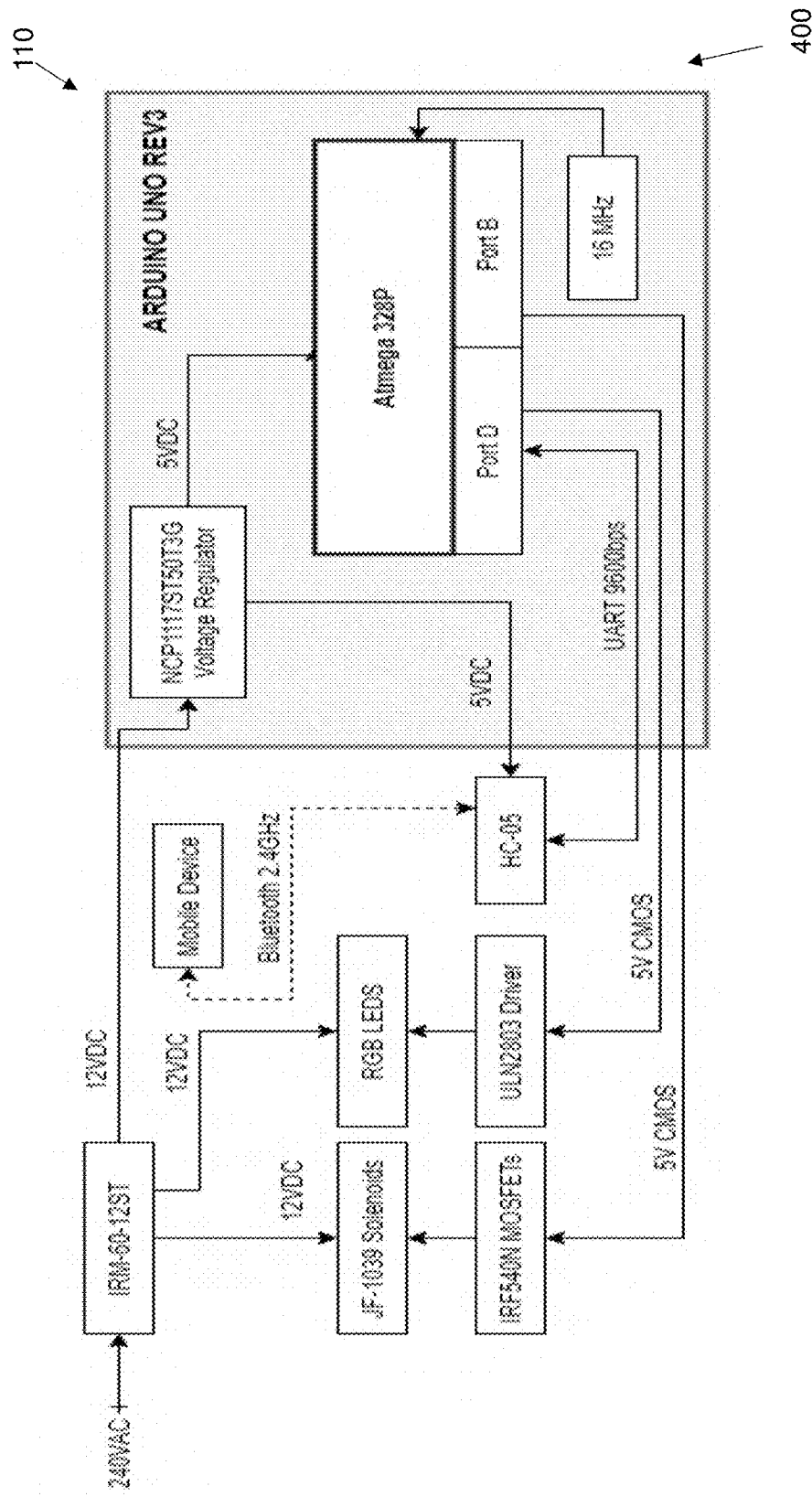
FIG. 15 is an exemplary high level system diagram of a control system for the dispensing system of FIGS. 3-5.

An exemplary high-level system diagram (400) of an embodiment of the system (100) is shown in FIG. 15. The system (100) may include interchangeable dispensers (10.1 to 10.4) (see also FIG. 3), each with a flexible container that may shut and dispense via solenoid actuators (62). The actuators (62) may be switched via MOSFETs by the microcontroller (110) that may receive UART signals through a Bluetooth module, which may interact with the mobile application that provides the user interface (UI) (114) through the user device (112). Indicator LEDs (118) may also be included in the system (100).

A control protocol of the controller (110) may rely on bitmasking designer-defined register addresses for control. A register address may indicate an associated microcontroller register which includes access to a pin used in control (for example a GPIO pin). The register address may further be defined by providing the register type (for example uint8_t) and/or an offset or index of an indicator bit (such as the index of the least significant bit of a block of control bits) to further locate the pin or block of pins. Pointers may be implemented to functions for tick retrieval and delay commands. Implementation may be performed in this way to allow the code to be adapted to different microcontrollers and pinouts with limited rewrites to the main control, apart from peripheral and serial setup. It may also limit the required computing power.

Control code may be triggered through user input to a mobile application via a connectivity module, such as a Bluetooth module, which interfaces with the microcontroller. Though interfacing via UART is herein described it should be appreciated that interfacing may be via any suitable communication protocol such as SPI, I2C or the like.

LED indicators may be used to connect or associate the UI (114) with the physical dispensing system (100) and dispensers (10.1 to 10.4) visually. RGB LEDs may be implemented to indicate power and connection status, and container selection or dispenser (10.1 to 10.4) selection. The LEDs (118) (see FIG. 3) may be driven by an integrated circuit (IC) connected to the power supply. The IC may include Darlington pair drivers.

Figure 16:
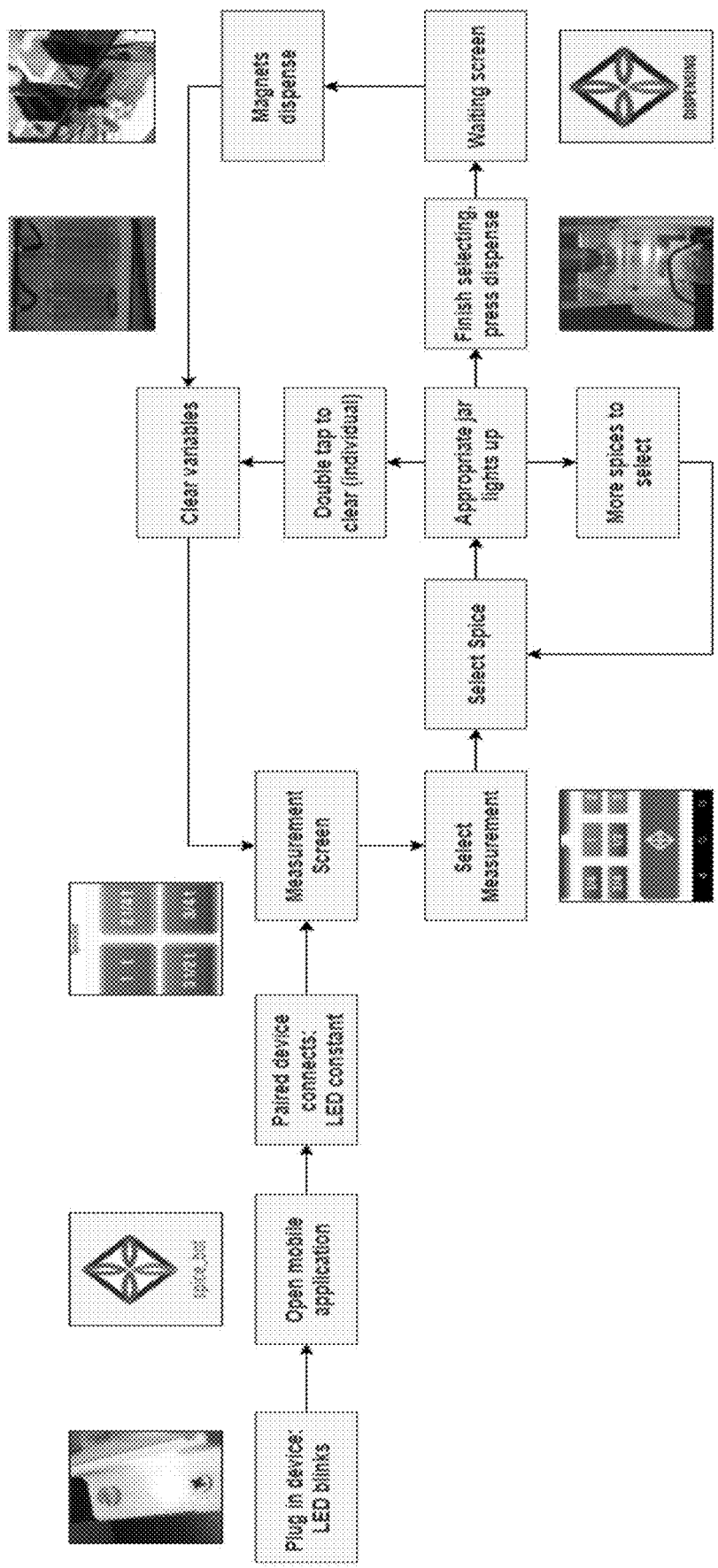
FIG. 16 is a flow diagram of an exemplary user experience when using the system of FIGS. 3-5.

An exemplary summary of a typical user experience can be seen in FIG. 16. When plugged in, a power LED may blink, indicating power to the system (100) and/or to the dispensing unit (200). The user (117) (see FIGS. 3-4) may then open the mobile application on a Bluetooth-enabled phone (112) or user device, and the device (112) may then connect to the system (100). The power LED may then change to a continuous light, indicating a proper connection. Once connected, the user (117) can first select the number of teaspoons and then the appropriate container or dispenser (10.1 to 10.4) on a measurement screen via the UI (114). When a container button is tapped, a screen of the user device (112) may change to display the currently-programmed number of teaspoons, and the corresponding physical container may then light up in a colour corresponding to the button on the UI (114). The user (117) may rely on a label on the spice container, or a label on the dispenser, coupled with the illumination and colour, to determine they have measured the correct spice, ingredient or product (18).

In the case of an error, measurements may be cleared by double-tapping the relevant container button and overwritten simply by selecting new measurements and tapping the container button again. Once the user (117) is finished selecting spices or products, the dispense button (120) (see FIG. 18) may be pressed. The container or dispenser LED lights may turn off and the solenoids may begin dispensing in set increments, for example one at a time in a rotational pattern while a "Dispensing" waiting screen (113) appears on the mobile device (112) or user device. This may preventing any more commands from being sent. The dispensing pattern may be limited by circuitry requirements, such as maximum allowable current draw and/or required heat dissipation.

Once a dispensing sequence is complete, the microcontroller (110) may send a "finished" command back to the mobile device, which may clear the buttons and this may return the UI to the measurement screen. The user (117) may then be free to dispense again.

Because the solenoids (62) may have an associated force rating, equations such as Newton's laws of motion and/or Hooke's law may be used to determine if the solenoids are strong enough to overcome the forces maintaining equilibrium and move the dispensing mechanism of the present disclosure. Diodes or transorbs may be included to prevent voltage spikes during switching.

Data and commands may be encoded together in single characters where possible to allow for possible optimisation with regard to response times. Such a protocol may allow for one command to substantially fit within a single data word or minimal data words.

Colour standardization techniques such as colour matching may be performed to match the LEDs of the device to the colour of the user interface. Matching may be performed using any suitable method, such as through the use of spectrophotometers or sensors with feedback algorithms, through visual inspection by people who have recently passed acuity examinations, by using colours from libraries with well-defined matching systems, through the use of a chromaticity graph and/or the like, as appropriate. The colour palette may be reduced to a web-safe palette (216 colours) to produce a larger difference between the red, green and blue hues.

The device may be designed to comply with the IPC-2221, SANS61140:26/IEC6114:2016 and/or other appropriate standards. The UI may be designed to comply with one or more points listed in accessibility guidelines, such as the Web Content Accessibility Guidelines 2.0 (WCAG) and/or Mobile Web Best Practices (MWBP) 1.0. For example, the UI as exemplified throughout the figures of the present disclosure may have a minimum colour contrast of 3.0 for large text so as to comply with the one aspect of the MWBP.

Some embodiments may implement power MOSFETs, specialised solenoid driver chips, automotive H-bridge drivers and Darlington pairs. Power MOSFETs with an applicable current rating may be used. In some embodiments, a substantial portion of the system (100) may be driven by transistors, potentially reducing the required silicon in the design. LED indicators may be added to display power, connection status and container or dispenser (10.1 to 10.4) selection. RGB LEDs with a diffused lens may be implemented so the colours may be matched to the UI (114). The colours of the LEDs may be chosen such that LED inputs may be set using a combination of open circuits and standard resistor values (for example E12 resistor values such as 560Ω, 15 kΩ, 1 kΩ).

Figure 21:
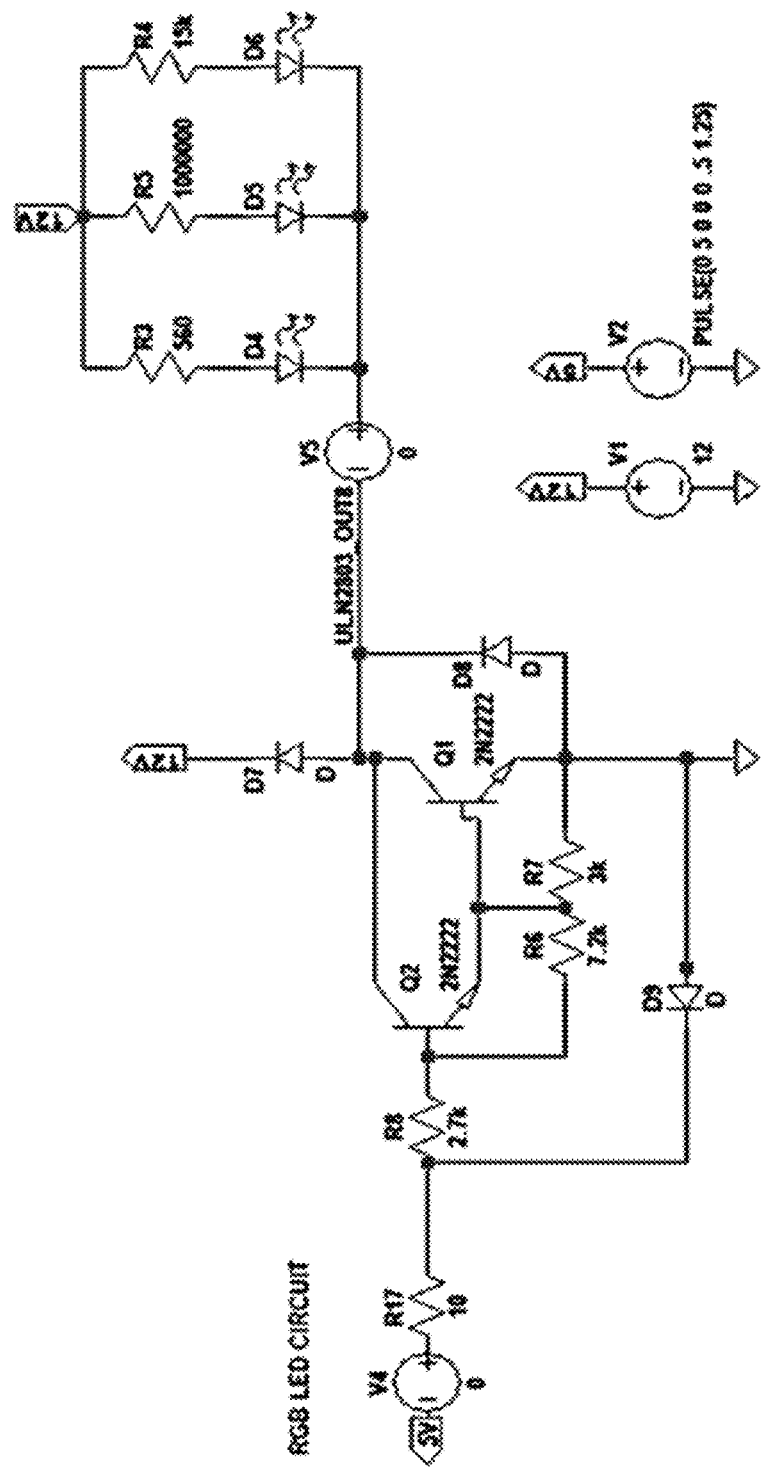
FIG. 21 is an exemplary circuit diagram of an integrated circuit that may be used for driving Light Emitting Diodes (LEDs) that may be implemented according to the present disclosure.
Figure 22:
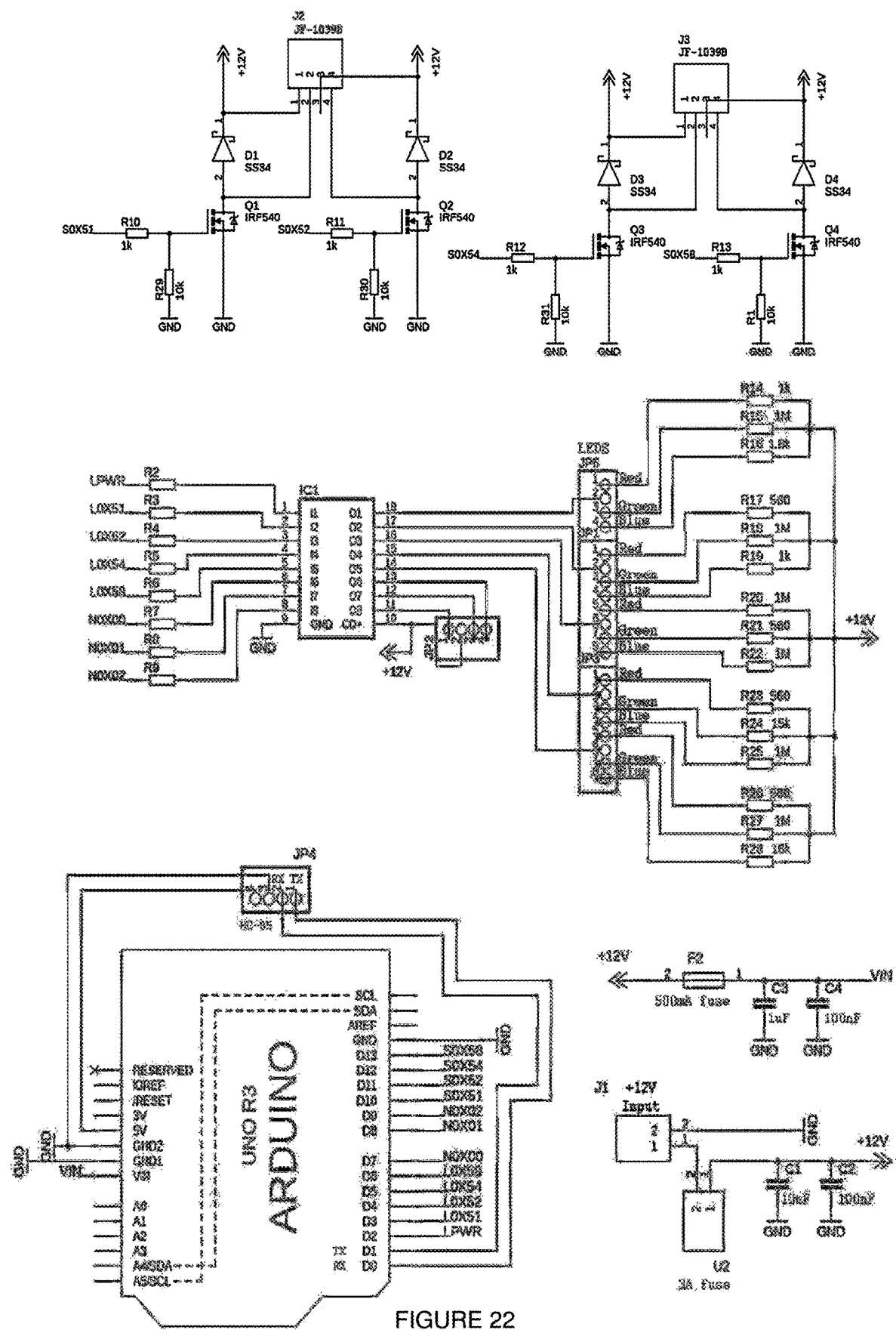
FIG. 22 is a schematic diagram illustrating various exemplary components that may be implemented by the present disclosure.

A detailed schematic of exemplary circuitry that may be implemented by the present disclosure is shown in FIGS. 21 and 22. The system may consist of seven main subsystems including a physical build, microcontroller protocol, user interface and four circuits: solenoids, LEDs, power and UART connections.

A balloon-like container or flexible container (12) may be advantageous because it may isolate powder or product (18) from other mechanics of the system (100). The dispensing unit (200) may also provide a potential for modularity, and the vibration of the stretching elastic may serve to dislodge any stuck powder. Modularity may be provided by the ability to easily swop out dispensers (10.1 to 10.4) from the dispensing unit (200). Minimal button presses of the UI may be needed to facilitate dispensing. The elasticity of the flexible container may also function as a spring, though this may typically be unnecessary with solenoid control. The containers or rigid support structure (24) may be arranged to be generally cuboid, rectilinear, or rectangular with the intention to be easily stackable. The flexible container may be implemented simply as a balloon-like container, however, it may preferably be replaced with a more suitable material like nitrile, silicone, or food-grade silicone, or surgical tubing, possibly with attached O-ring. Double pinching the bladder or flexible container with a dispensing arm may also be implemented as is diagrammatically shown in FIG. 25.

Solenoids may be preferred over motors, however electric motors and gears may also be implemented by the present disclosure, to move the moveable dispensing arm(s) (50). However, the use of solenoids may be mechanically simpler, and may reduce overall complexity of the system. This may, in turn, reduce mechanical wear and require less maintenance, providing a more robust overall system (100). Solenoids may be mounted solid, which may provide additional stability, alignment and this may also alleviate disturbance rejection concerns caused by the dispensing motion.

Algorithms and accompanying protocol may be developed with the intention of being general and computationally simple, bearing in mind that the choice of microcontroller may change in future, for example when production is scaled. Code setup may also aid prototyping, where the pin position and solenoid timing may be changed in the definitions, without altering the code. In some embodiments, the control code may assume an inputted string of uint8_t characters to correspond with UART transmission. The first four bits of each character may designate which type of character it is; the last four characters may provide the value. The code may parse the characters by matching the first four bits to determine the type, then processing the last four bits according to the information they provide. In an exemplary protocol, characters prefixed with 0x4 indicate commands, a 0x5 prefix indicates a pin location within a register address, and a 0x3 prefix indicates a number. The 0x3 prefix corresponds to the ASCII code for the same number. A list of exemplary control codes can be seen in Table 1 and exemplary address codes in Table 2.

TABLE 1

Command Codes: 0x4_

| HEX | CHARACTER | COMMAND | DESCRIPTION | SENDER | RECEIVER |
|---|---|---|---|---|---|
| 0x43 | C | Connect | Connect to SpiceBot | User Device | Microcontroller |
| 0x46 | F | Finish | Return to Measurement Screen | Microcontroller | User Device |
| 0x4C | L | Light | Light the Indicator | User Device | Microcontroller |
| 0x4D | M | Measure | Dispense | User Device | Microcontroller |

TABLE 2

Address Codes: 0x5_

| HEX | BINARY | UI COLOUR | UI LOCATION | PHYSICAL LOCATION (L-R) |
|---|---|---|---|---|
| 0x58 | 0b0101 1000 | Pink | Top Left | First Container |
| 0x54 | 0b0101 0100 | Orange | Top Right | Second Container |
| 0x52 | 0b0101 0010 | Green | Bottom Left | Third Container |
| 0x51 | 0b0101 0001 | Purple | Bottom Right | Fourth Container |

TABLE 3

Command Sequences

| HEX | DESCRIPTION |
|---|---|
| 0x43 0x0A | Connect to SpiceBot |
| 0x46 0x0A | Return to measurement screen |
| 0x4C 0x5_ 0x0A | Light the container at the following address |
| 0x4D 0x3_ 0x3_ 0x3_0x3_ 0x3_ 0x3_ 0x3_0x3_ 0x0A | Dispense the following amounts |

Once the command is determined, the information may be processed and the appropriate control register may be bit-masked. For example, to light one of four containers using an 8-bit microcontroller, the microcontroller may implement one or more of the following steps: poll for incoming serial; copy the received character into a buffer; determine if the incoming data is a command; determine the command is "light;" receive an incoming data character denoted as a protocol address or pin location; access the register at the designer designed register address and apply an appropriate mask or series of masks to the register offset by the defined LSB. The mask may comprise a portion of the protocol address code. For example, the microcontroller may OR the register located at the designer defined register address with mask including a portion of the protocol address code shifted by the designer-defined LSB. The protocol address codes may be one hot encoded so as to ensure only one solenoid or light is active at a time. Protocol address codes may be layered within the mask if simultaneous actuations are required. Example excerpts of C++ code for lighting a container according to the protocol as described by Tables 1 and 2 can be seen in FIG. 27. A similar approach may be followed for implementing other command sequences, such as dispensing.

In the case of the measurement sequence, the SpiceBot or system (100) may assume the first two characters (0X3_ and 0x3_) are allocated to a pin location denoted by 0x58, the next two are for 0x54, followed by two for 0x52 and a final two characters for 0x51. The two characters may represent the fractional (number of ¼ teaspoons) and integer number of teaspoons to be dispensed. If a value is zero, the character sent may be 0x30. The code then uses bitshifting to produce characters for functional logic, according to the following listing. The command sequences have no delineators, apart from ending with the newline character, 0x0A. A list of the possible sequences can be seen in Table 3.

Figure 17:
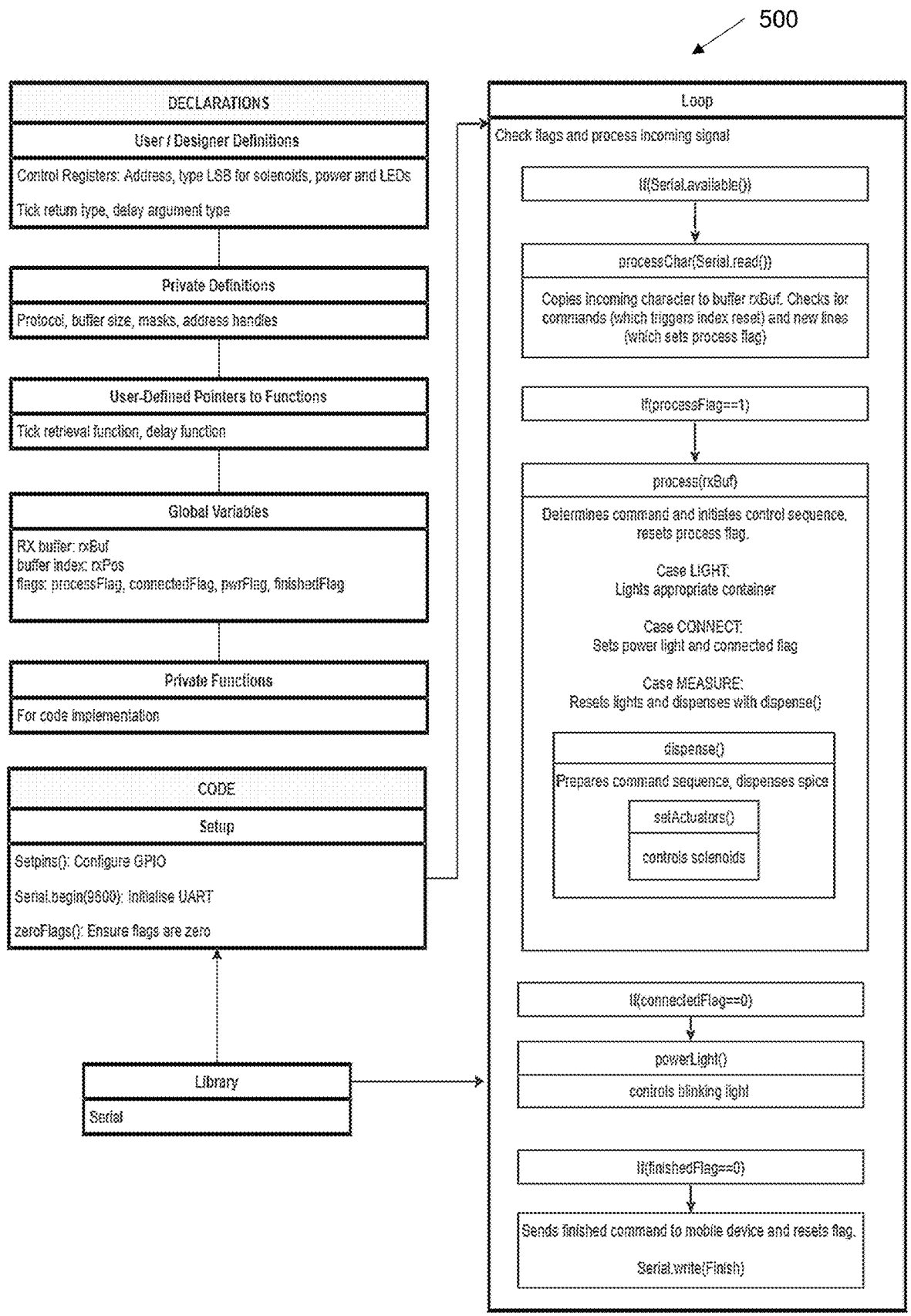
FIG. 17 is an exemplary flow diagram illustrating microcontroller code that may be implemented to program a controller in accordance with the present disclosure.

The protocol may assume a block of four bits has been allocated for the lights control in a single register; the same for the solenoids and a single bit for the power light. The code may be configured such that if the designer defines the control register addresses for the lights, addresses for the solenoids, register sizes, the index of the least significant bit, and an address of a tick retrieval function, the control functions may work with minimal setup. A diagram (500) of the exemplary microcontroller code can be seen in FIG. 17.

UI design may be focused primarily on convenience, visual appeal and accessibility. The user interface (114), which consists of a measurement and waiting screen, along with the application icon, are shown in FIG. 18.

Button placement may be optimised. A limited number of potential combinations for button presses may be implemented, so as to facilitate ease of using the UI (114). The buttons (115) may be arranged in a general format shown in the top left of FIG. 18. To determine the optimal button placement, the layout may be displayed and/or printed, and each button may be labelled. The distance from the centre of each button's centre to every other button's centre may be measured. It may be rounded to simplify calculations. The obtained distances may be used to estimate the distance ($d_B$) of each possible sequence of button presses. Using a dataset of the most commonly used sequences (in this example, the frequency of measurements as found in recipes), the distance of each sequence may be weighted according to the measurement frequency ($f_M$), as seen in Equation 1:

$$S = \sum_M \sum_B d_B(1 - f_M) \qquad (1)$$

B={0x51, 0x52, 0x54, 0x58}
M={¼, ½, ¾, 1, 1¼, 1½, 1¾, 2, 2¼, 2½, 2¾, 3, 3¼, 3½, 3¾}

To illustrate, one teaspoon (or about 5 ml) may be the most commonly used measurement with a frequency of 0.32 (the number of teaspoon appearances over the total number of appearances of all measurements), so the distance from 1 teaspoon to each of the four container buttons (on the UI (114)) may be noted and summed, and the sum weighted by (1-0.32). Several configurations for the location of 1 teaspoon and the other measurement buttons may be considered or implemented. A configuration with the lowest score may be implemented as shown in FIG. 18. A summary of exemplary calculations can be seen in Table 4.

TABLE 4

Possible Button Configurations

| CONFIGURATION | BUTTON ARRANGEMENT | WEIGHTED SUM (S) |
|---|---|---|
| Set 1 | 1, 2, 3; ¼; ½; ¾; | 8591 |
| Set 2 | ¼, 1, 2; ½; ¾; 3; | 8202 |
| Set 3 | ¼, 1, 2; ¾; ½; 3; | 8114 |
| Set 4 | ½, 1, 2; ¾; ¼; 3; | 8114 |

Lower-scored configurations may thus be implemented for the user interface (114). Since the dispenser, system and method of the present disclosure may aim to optimise a mundane task and since it may have the potential to be used often, calculating the most convenient button placement may be deemed a valuable addition for enhancing the user experience.

Figure 19:
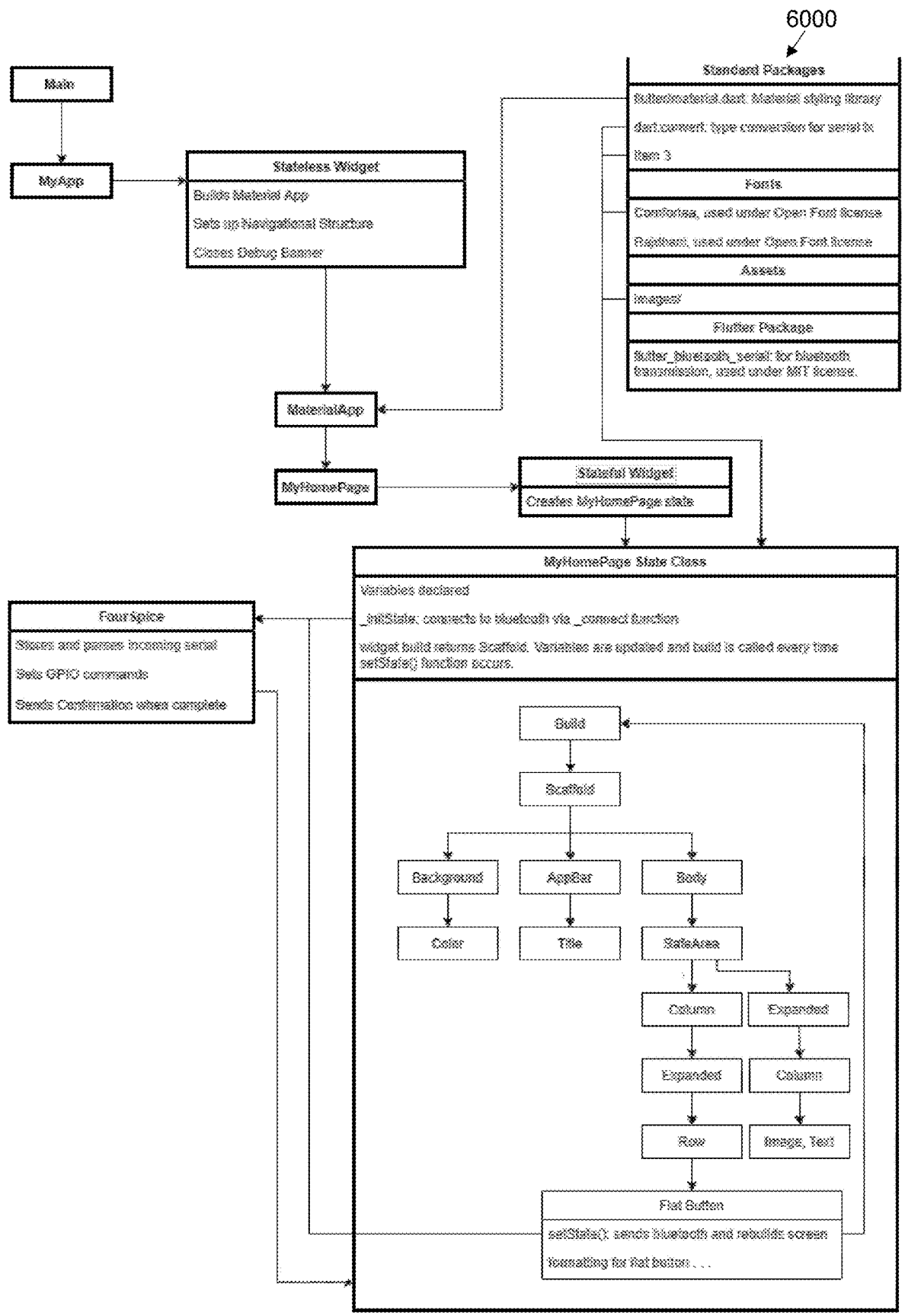
FIG. 19 is a diagram illustrating an exemplary structure of a mobile application that may be implemented on the user device.

The user interface (114) may be implemented and/or developed as a Flutter application using Dart in Android Studio. The main programme may contain the code to be transmitted to the microcontroller as well as the build widget, which may return a scaffold representing the design of the screen. The general layout of stateless and stateful widgets may be standard to a Flutter application. A returned scaffold, which comprises styling and functional code, may be developed or implemented specifically for the application which may be referred to as a SpiceBot app. A diagram (6000) of exemplary code structure can be seen in FIG. 19.

Figure 20:
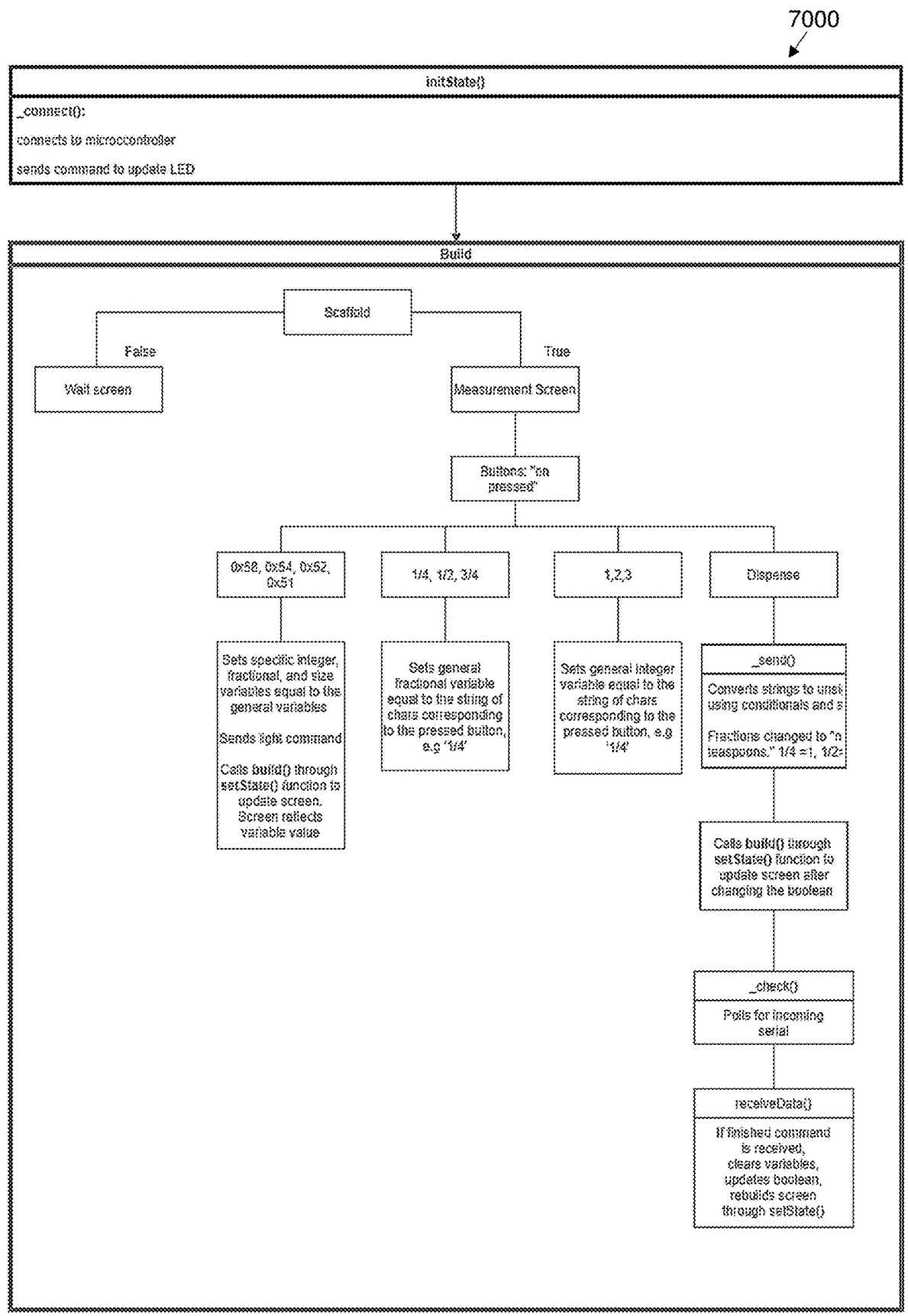
FIG. 20 is a diagram illustrating exemplary functional logic that may be implemented by the mobile application.

Integer and fractional variables may be declared for each container or dispenser (10.1 to 10.4), as well as a general set to record the current button state. When a measurement button is pressed (fractional or integer), the value may be copied to the respective variable. It may then be copied to a specific container variable when a container button (or dispenser button) is pressed, and the general result may be cleared. This variable may be directly displayed within the user interface (114). When dispense (120) is pressed, the values of the specific container variables (or dispenser variables) are converted to unsigned characters and transmitted one at a time via Bluetooth serial functions to the microcontroller (110). "Size" variables may also be declared for each container or dispenser (10.1 to 10.4), and as general variables to control the visibility of the "t" (for teaspoons) seen on the measurement screen (see FIG. 18). An exemplary diagram (7000) of the code logic can be seen in FIG. 20.

A summary of exemplary prototypes can be seen in FIG. 23. Several prototypes were built to test possible embodiments of dispensers and containers. Cardboard was initially used because it was inexpensive and a weak material; material failure in the different cardboard models quickly showed the stress points that may be considered in further designs or embodiments.

The system, method and dispenser of the present disclosure may alleviate a portion of the time and effort required in domestic cooking by automating the jar opening, dispensing and measuring through the development of the app-controlled spice-dispensing machine or dispensing unit (100) and dispensing system (100). User experience, feasibility and potential for future improvements (especially with a view toward possible commercialisation) may be provided by the present disclosure. Modularity and scalability may also be provided by the dispensing system (100), dispensing unit (200), dispenser (100) and method described herein.

Referring again to FIGS. 3-4, in the exemplary embodiment, the system (100) and its subsystems (i.e. the containers (10.1-10.4) the base unit or dispensing unit (200) the sockets (70) and the solenoids (62)) may be housed in a housing as shown. This may provide an integrated system (100). Spices, seasoning or product (18) may dispense from a front of the dispensing unit (200) as shown in FIG. 3. In the example embodiment, the solenoids (62), circuitry (123), power (124) and connectivity (110 to 112) displayed in the back of the dispensing unit (200). The dispensing unit is in this example embodiment made from a transparent material to show its interior, but other materials of manufacturing it may also be used.

Other applications, such as dispensing sugar for tea, coffee, milk, other liquids or dispensing medicine (whether in particulate, liquid or other form) may also be implemented. The product may thus be a liquid, a solid, a particulate or a granular substance. The dispenser disclosed herein may be easy to maintain, easy to disassemble, and easy to clean. The flexible container may be easily removed and replaced if needed. Alternatively, the dispenser may be replaced once empty, and plugged or placed into the relevant socket on the dispensing unit.

The present disclosure may provide a simplified dispenser in which the substance or product is isolated from moving parts by a deformable body or a flexible container. Selective pinching of the deformable body or flexible container may control dispensing and the amount dispensed. Manipulating the shape of the deformation with the design of the dispensing arm may possibly remove the need for a vibrator (commonly used to dislodge particles in rigid bodies), as well as isolate the substance from the moving parts. The inherent elasticity of the deformable or flexible container may act as a vibrator to shake loose product therefrom. The dispensing unit may have interchangeable/removable, freestanding containers or dispensers, each with its own actuator.

The actuators may be MOSFET driven solenoid actuators and the user interface may be implemented as a mobile application. Connectivity between the two may occurs via a Bluetooth module and microcontroller. Container or dispenser selection may be made visible to the user by programmatically controlled LEDs. Control code may be written primarily on the register level. The dispenser (10) may dispense a variety of substances, for example spices or seasoning, using a relatively simple mechanical design that can be cost effective to manufacture. This may increase the efficiency and accessibility of performing measuring and dispensing tasks for the user.

The present disclosure may remove the need for paper packets/communal spoons in the case of an application for spice/condiment dispensing. This may increase efficiency. The dispenser may be arranged to dispense powders and liquids with the same dispensing unit, using the same mechanism. One or more seals may be provided, depending on the type of product or liquid dispensed. A linear arrangement of dispensers as shown in the drawings may be advantageous, as larger designs may not increase the size of the dispenser, apart from making the overall dispensing unit longer (but not wider, as would be the case for a radial design). Some of the known dispensing systems are circular, meaning container size and number of containers is limited by a feasible circle size, with increasingly larger wasted space in the centre. A linear design may add as many dispensers as is necessary, with the potential of being modular. Radial design is also limited in the substances it can dispense. If a radial dispenser is to dispense powders and liquids, the rotational movement of the dispenser will have to handle the inertia of moving liquids with sufficient calibration, which is a highly complex problem, as well as providing seals for both powders and liquids in one place which may be cumbersome or impossible. With the present disclosure, each dispenser may have its own type of seal, arranged to seal liquid or dryer products, as the case may be. Using known dispensers, dispensing something like milk and sugar, using the same dispenser may be far more complex, if even possible. The present disclosure may be implemented domestically, or commercially, for example in a factory or a restaurant. A magnet may also be implemented to hold the moveable dispensing arm in the retaining condition, for example when it is removed from the dispensing unit, or when in use. The actuator may be arranged to overcome the magnetic force of the one or more magnets.

The moveable dispensing arm may have the general shape of an F, or an inverted F. However other shapes may also be possible, such as a C-shape, a U-shape, or one or more elongated sliders that may be independently moved by actuators (as is diagrammatically shown in FIG. 25). The upright member of the moveable dispensing arm may also be omitted and one or more prongs or protrusions with one or more pinching edges may be moveable by actuator(s). The shape of the dispensing arm may be optimised or configured to produce the desired deformation of the container.

The microcontroller (110) may include a processor for executing the functions of components described herein, which may be provided by hardware or by software units executing on the microcontroller. The software units may be stored in a memory component and instructions may be provided to the processor to carry out the functionality of the described components. In some cases, for example in a cloud computing implementation, software units arranged to manage and/or process data on behalf of the controller may be provided remotely. Some or all of the components may be provided by a software application downloadable onto and executable on the controller (110).

The user device (112) may include a processor for executing the functions of components described herein, which may be provided by hardware or by software units executing on the user device. The software units may be stored in a memory component and instructions may be provided to the processor to carry out the functionality of the described components. In some cases, for example in a cloud computing implementation, software units arranged to manage and/or process data on behalf of the user device may be provided remotely. Some or all of the components may be provided by the software application downloadable onto and executable on the user device (112).

Known dispensers for substances of fine particle size, may require vibrating motors to dislodge the particles from a container housing. Moreover, spillage of particles within the machine may cause mechanical wear. Known dispensers of multiple substances may require identifiers of the corresponding substances, and these may need to be stored in memory and monitored and/or used by a controller. Including such information may require a database of specific substance identifiers. Having such a database may either increase the rigidity of the system (only pre-programmed containers or dispensers may in such a case be recognised by the system), or this may unnecessarily increase the complexity for a user (the user may need to learn to program each individual container). It will be appreciated by those skilled in the art that the present disclosure may alleviate or overcome these drawbacks.

Figure 26:
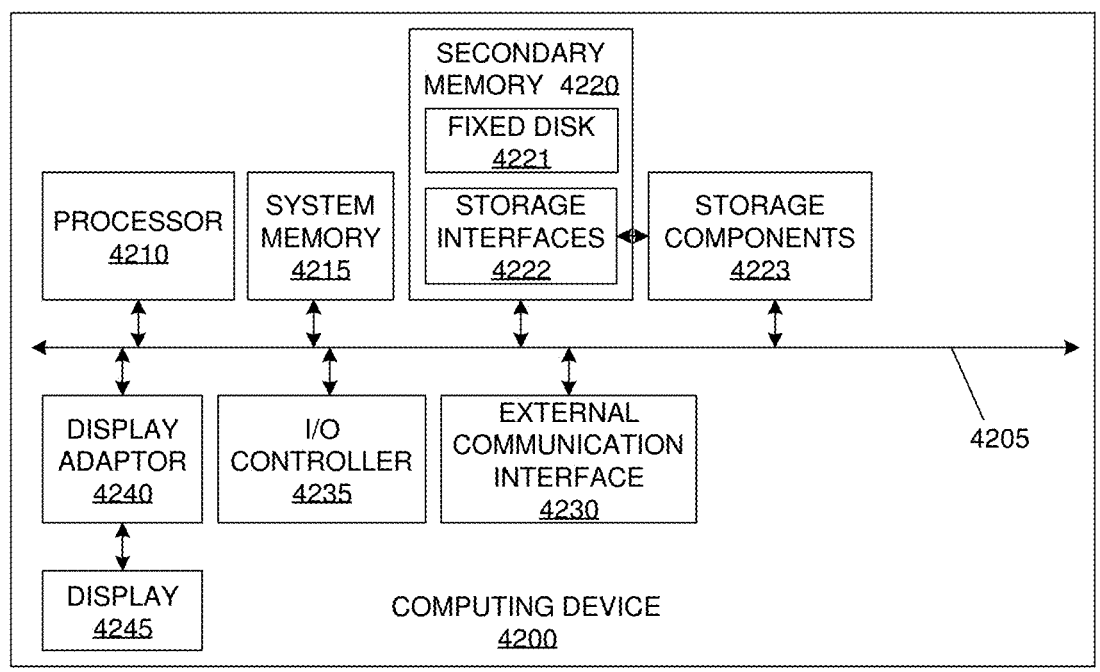
FIG. 26 is an exemplary block diagram of a computing device in which various aspects of the disclosure may be implemented.

FIG. 26 illustrates an example of a computing device (4200) in which various aspects of the disclosure may be implemented, for example the user device (112) and the controller (110). The computing device (4200) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (4200) may be suitable for storing and executing computer program code. The various participants and elements in the previously described system diagrams may use any suitable number of subsystems or components of the computing device (4200) to facilitate the functions described herein. The computing device (4200) may include subsystems or components interconnected via a communication infrastructure (4205) (for example, a communications bus, a network, etc.). The computing device (4200) may include one or more processors (4210) and at least one memory component in the form of computer-readable media. The one or more processors (4210) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (4200) may be distributed over a number of physical locations (e.g. in a distributed, cluster or cloud-based computing configuration) and appropriate software units may be arranged to manage and/or process data on behalf of remote devices.

The memory components may include system memory (4215), which may include read only memory (ROM) and random access memory (RAM). A basic input/output system (BIOS) may be stored in ROM. System software may be stored in the system memory (4215) including operating system software. The memory components may also include secondary memory (4220). The secondary memory (4220) may include a fixed disk (4221), such as a hard disk drive, and, optionally, one or more storage interfaces (4222) for interfacing with storage components (4223), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (4200) may include an external communications interface (4230) for operation of the computing device (4200) in a networked environment enabling transfer of data between multiple computing devices (4200) and/or the Internet. Data transferred via the external communications interface (4230) may be in the form of signals, which may be electronic, electromagnetic, optical, radio, or other types of signal. The external communications interface (4230) may enable communication of data between the computing device (4200) and other computing devices including servers and external storage facilities. Web services may be accessible by and/or from the computing device (4200) via the communications interface (4230).

The external communications interface (4230) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (4230) may include a subscriber identity module (SIM) in the form of an integrated circuit that stores an international mobile subscriber identity and the related key used to identify and authenticate a subscriber using the computing device (4200). One or more subscriber identity modules may be removable from or embedded in the computing device (4200).

The computer-readable media in the form of the various memory components may provide storage of computer-executable instructions, data structures, program modules, software units and other data. A computer program product may be provided by a computer-readable medium having stored computer-readable program code executable by the central processor (4210). A computer program product may be provided by a non-transient or non-transitory computer-readable medium, or may be provided via a signal or other transient or transitory means via the communications interface (4230).

Interconnection via the communication infrastructure (4205) allows the one or more processors (4210) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (4200) either directly or via an I/O controller (4235). One or more displays (4245) (which may be touch-sensitive displays) may be coupled to or integrally formed with the computing device (4200) via a display or video adapter (4240).

The foregoing description has been presented for the purpose of illustration; it is not intended to be exhaustive or to limit the invention to the precise forms disclosed. Persons skilled in the relevant art can appreciate that many modifications and variations are possible in light of the above disclosure. Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described functions, algorithms, or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations. Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A dispenser comprising:
a flexible container having a top and a bottom and capable of holding a product therein, the flexible container including top and bottom openings;
a rigid support structure that supports the flexible container; and
a moveable dispensing arm that operatively facilitates product dispensing, wherein the moveable dispensing arm is operable between a dispensing condition and a retaining condition, the dispensing arm including a pinching edge which is configured to pinch the flexible container shut in either the dispensing condition or the retaining condition of the dispensing arm, and wherein the moveable dispensing arm includes a retaining surface arranged to close the bottom opening of the flexible container in the retaining condition of the dispensing arm.

2. The dispenser as claimed in claim 1, wherein the moveable dispensing arm is, in use, moved by an actuator operable to move the dispensing arm between the dispensing condition and the retaining condition.

3. The dispenser as claimed in claim 1, wherein the flexible container is arranged such that movement of the moveable dispensing arm from the retaining condition to the dispensing condition causes the flexible container to elastically deform, thereby facilitating product to be released from an inner wall of the flexible container.

4. The dispenser as claimed in claim 1, wherein the moveable dispensing arm is arranged to retain product in the flexible container in the retaining condition.

5. The dispenser as claimed in claim 1, wherein the pinching edge is configured to pinch the flexible container shut in the dispensing condition at a location above its bottom opening, so that any product located operatively below the pinching edge is dispensed.

6. The dispenser as claimed in claim 1, wherein the pinching edge is configured to pinch the flexible container near its bottom opening in the retaining condition of the dispensing arm, so as to inhibit more product from being dispensed.

7. The dispenser as claimed in claim 1, wherein the rigid support structure has a hole therethrough, wherethrough the flexible container extends in use.

8. The dispenser as claimed in claim 7, wherein the dispensing arm, and an actuator operable to move the dispensing arm between the dispensing condition and the retaining condition, are arranged to pinch the flexible container shut in the dispensing condition, by moving the pinching edge towards a periphery of the hole in the rigid support structure wherethrough the flexible container extends, thereby shutting the flexible container above the pinching edge and inhibiting the remainder of the product in the flexible container to be dispensed.

9. The dispenser as claimed in claim 1, wherein the moveable dispensing arm is arranged to dispense a predefined amount of product in the dispensing condition.

10. The dispenser as claimed in claim 9, wherein the moveable dispensing arm is arranged, in the dispensing condition, to move the retaining surface of the moveable dispensing arm away from the bottom opening of the flexible container, thereby causing the predefined amount of product to be dispensed from the flexible container.

11. The dispenser as claimed in claim 10, wherein the predefined amount of product is defined by a volume of the flexible container in a region between the pinching edge and the retaining surface of the moveable dispensing arm.

12. The dispenser as claimed in claim 1, wherein the moveable dispensing arm includes two pinching edges, with an upper pinching edge arranged to pinch the flexible container shut at a location above its bottom opening in the dispensing condition, and a lower pinching edge arranged to pinch the flexible container shut at or near the bottom opening thereof in the retaining condition.

13. A dispensing method comprising:
providing one or more dispensers as in claim 1; and
in use, causing the moveable dispensing arm of at least one of the one or more dispensers to be moved between the dispensing condition and the retaining condition.

14. The dispenser as claimed in claim 1, wherein the dispensing arm includes upper and lower prongs, with the upper prong defining the pinching edge and the lower prong defining the retaining surface.

15. The dispenser as claimed in claim 14, wherein the upper prong includes a hole therein, and wherein the pinching edge is defined by at least part of the periphery of the hole in the upper prong.

16. The dispenser as claimed in claim 15, wherein the flexible container extends through the hole in the upper prong.

17. The dispenser as claimed in claim 16, wherein movement of the dispensing arm causes the hole therein to become offset from a hole in the support structure, thereby pinching the flexible container between the pinching edge and the periphery of the hole in the support structure, so as to shut the flexible container at the pinching edge.

18. A dispensing system comprising:
a controller which includes a memory for storing computer-readable program code and a processor for executing the computer-readable program code;
at least one dispenser which includes:
a flexible container having a top and a bottom and capable of holding a product therein, the flexible container including top and bottom openings;
a rigid support structure that supports the flexible container; and
a moveable dispensing arm that operatively facilitates product dispensing; and
an actuator which is controlled by the controller and operable to move the dispensing arm between a dispensing condition and a retaining condition, the dispensing arm including a pinching edge which is configured to pinch the flexible container shut in either the dispensing condition or the retaining condition of the dispensing arm, wherein the moveable dispensing arm includes a retaining surface arranged to close the bottom opening of the flexible container in the retaining condition of the dispensing arm.

19. The system as claimed in claim 18, wherein the system further includes a user device having a user interface thereat, the user device being operable to receive user input through the user interface, wherein the user device is in data communication with the controller, wherein the user device is operable to transmit the user input to the controller and wherein the controller is, responsive to receiving the user input, arranged to cause the actuator to dispense the product.

* * * * *